(12) United States Patent
Yasue

(10) Patent No.: US 10,830,707 B2
(45) Date of Patent: Nov. 10, 2020

(54) INSPECTION METHOD, INSPECTION AND REPORTING METHOD, MANUFACTURING METHOD INCLUDING THE INSPECTION METHOD, INSPECTION APPARATUS, AND MANUFACTURING APPARATUS

(71) Applicant: YOSHINO GYPSUM CO., LTD., Tokyo (JP)

(72) Inventor: Kenzo Yasue, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 54 days.

(21) Appl. No.: 16/316,168

(22) PCT Filed: Jun. 16, 2017

(86) PCT No.: PCT/JP2017/022279
§ 371 (c)(1),
(2) Date: Jan. 8, 2019

(87) PCT Pub. No.: WO2018/012192
PCT Pub. Date: Jan. 18, 2018

(65) Prior Publication Data
US 2020/0124541 A1    Apr. 23, 2020

(30) Foreign Application Priority Data
Jul. 12, 2016 (JP) ................. 2016-137994

(51) Int. Cl.
G01N 21/898    (2006.01)

(52) U.S. Cl.
CPC ................. G01N 21/898 (2013.01)

(58) Field of Classification Search
CPC .................................................... G01N 21/898
(Continued)

(56) References Cited

U.S. PATENT DOCUMENTS 5,067,812 A * 11/1991 Sugimura ........ G01N 21/95623
356/237.5
6,222,935 B1 * 4/2001 Okamoto ......... G01N 21/95607
382/147

(Continued)

FOREIGN PATENT DOCUMENTS

EP    1832867    9/2007
JP    S58-070150    4/1983

(Continued)

OTHER PUBLICATIONS

International Search Report for PCT/JP2017/022279 dated Aug. 29, 2017.

(Continued)

*Primary Examiner* — Roy M Punnoose
(74) *Attorney, Agent, or Firm* — IPUSA, PLLC

(57) ABSTRACT

An inspection method for inspecting a board-shaped inspection object with a pattern includes an imaging step of capturing an original image of an inspection surface of the inspection object, a digitization step of generating an image with two or three gradation levels by digitizing the original image captured by the imaging step using a threshold, and a determination step of inspecting the inspection object using the image generated by the digitization step.

19 Claims, 17 Drawing Sheets

(58) Field of Classification Search
USPC .................................................. 356/237.5
See application file for complete search history.

(56) References Cited

U.S. PATENT DOCUMENTS

| | | | |
|---|---|---|---|
| 2002/0197750 A1* | 12/2002 | Tanaka | G01N 23/2251 |
| | | | 438/14 |
| 2008/0030745 A1 | 2/2008 | Felk et al. | |
| 2012/0131529 A1 | 5/2012 | Hayakawa et al. | |

FOREIGN PATENT DOCUMENTS

| | | |
|---|---|---|
| JP | S60-227107 | 11/1985 |
| JP | S63-075507 | 4/1988 |
| JP | H06-147855 | 5/1994 |
| JP | 2000-132684 | 5/2000 |
| JP | 2002-181718 | 6/2002 |
| JP | 2004-334491 | 11/2004 |
| JP | 2005-164309 | 6/2005 |
| JP | 2007-248376 | 9/2007 |
| JP | 2008-155345 | 7/2008 |
| JP | 2010-139461 | 6/2010 |
| JP | 2014-219256 | 11/2014 |

OTHER PUBLICATIONS

Extended European Search Report for 17827323.1 dated Aug. 8, 2019.

* cited by examiner

INSPECTION METHOD, INSPECTION AND REPORTING METHOD, MANUFACTURING METHOD INCLUDING THE INSPECTION METHOD, INSPECTION APPARATUS, AND MANUFACTURING APPARATUS

TECHNICAL FIELD

The present invention relates to an inspection method for inspecting a board-shaped inspection object, an inspection and reporting method, a manufacturing method for manufacturing a board with a pattern and including the inspection method, an inspection apparatus, and a manufacturing apparatus for manufacturing a board patterned with hole-like dents.

BACKGROUND ART

Processed product surfaces of large-size building boards such as gypsum boards have been visually inspected by workers.

However, because processed product surfaces have various shapes and patterns, it is laborious for workers to visually inspect the processed product surfaces to detect defects.

Also, when processed product surfaces have a complex pattern, it is often difficult to detect irregularities of the pattern and differentiate between pattern elements and flaws by visual inspection. Accordingly, defective products cannot be removed completely by visual inspection and may remain in final products. For the above reasons, there is a demand for a machine that can inspect even complex patterns.

For example, Patent Document 1 proposes an inspection apparatus that inspects an inspection object having a vertical pattern represented by a grayscale image by using image processing.

RELATED-ART DOCUMENT

Patent Document

[Patent Document 1] Japanese Laid-Open Patent Publication No. 2000-132684

DISCLOSURE OF INVENTION

Problems to be Solved by the Invention

However, the proposed inspection apparatus only detects foreign matter in regular vertical patterns and can inspect only limited types of patterns on inspection objects. Also, the proposed inspection apparatus cannot detect irregularities of the pattern.

For the above reasons, the present invention aims to provide an inspection method that can improve inspection efficiency regardless of the types of patterns on inspection objects.

Means for Solving the Problems

To solve the above problems, an aspect of the present invention provides an inspection method for inspecting a board-shaped inspection object with a pattern. The inspection method includes an imaging step of capturing an original image of an inspection surface of the inspection object, a digitization step of generating an image with two or three gradation levels by digitizing the original image captured by the imaging step using a threshold, and a determination step of inspecting the inspection object using the image generated by the digitization step.

Advantageous Effect of the Invention

An aspect of the present invention makes it possible to improve inspection efficiency of an inspection method regardless of the types of patterns on inspection objects.

DESCRIPTION OF EMBODIMENTS

Embodiments of the present invention are described below with reference to the accompanying drawings.

<Overall Description>

Figure 1:
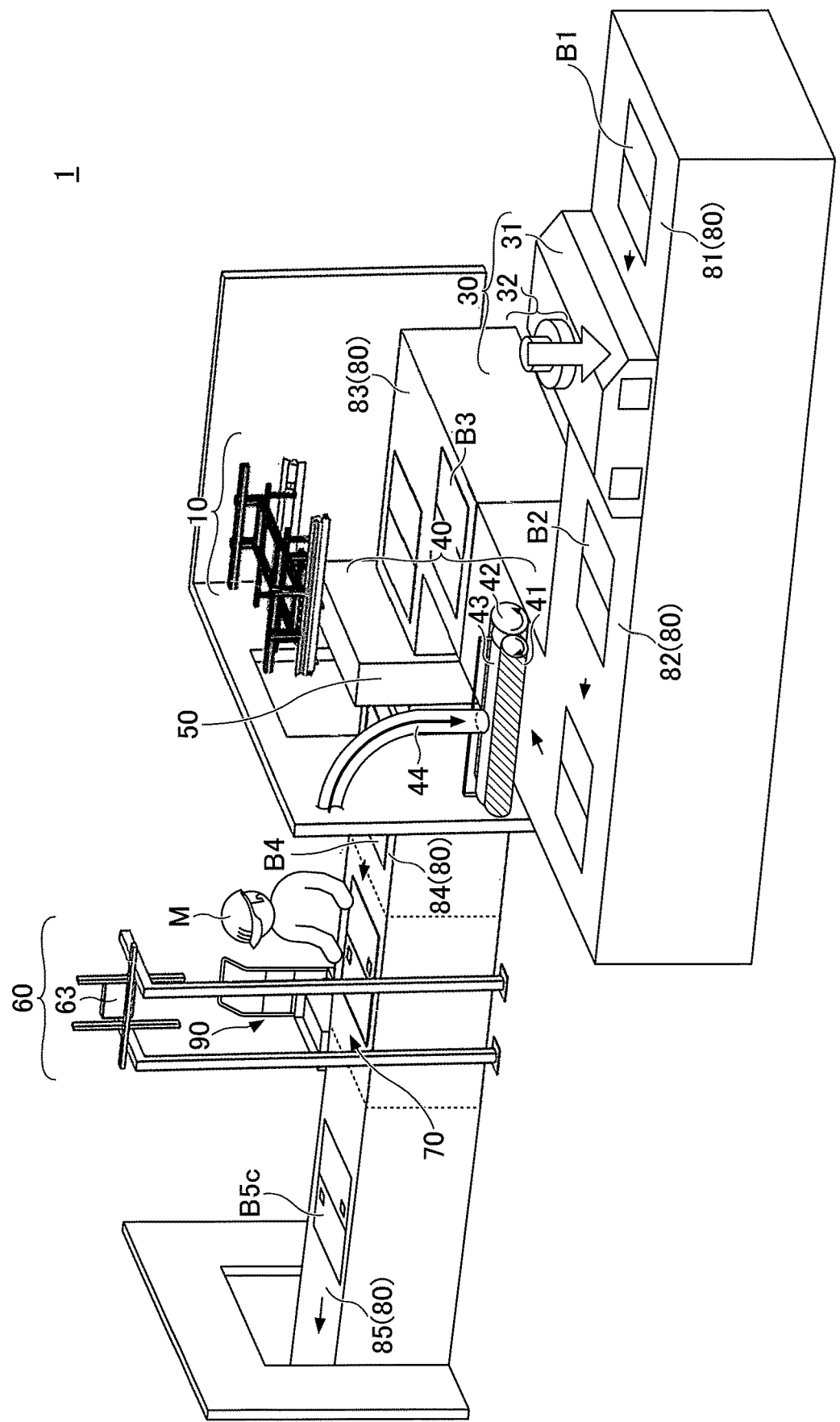
FIG. 1 is a perspective view of a processing and inspection system according to a first embodiment of the present invention.
Figure 2:
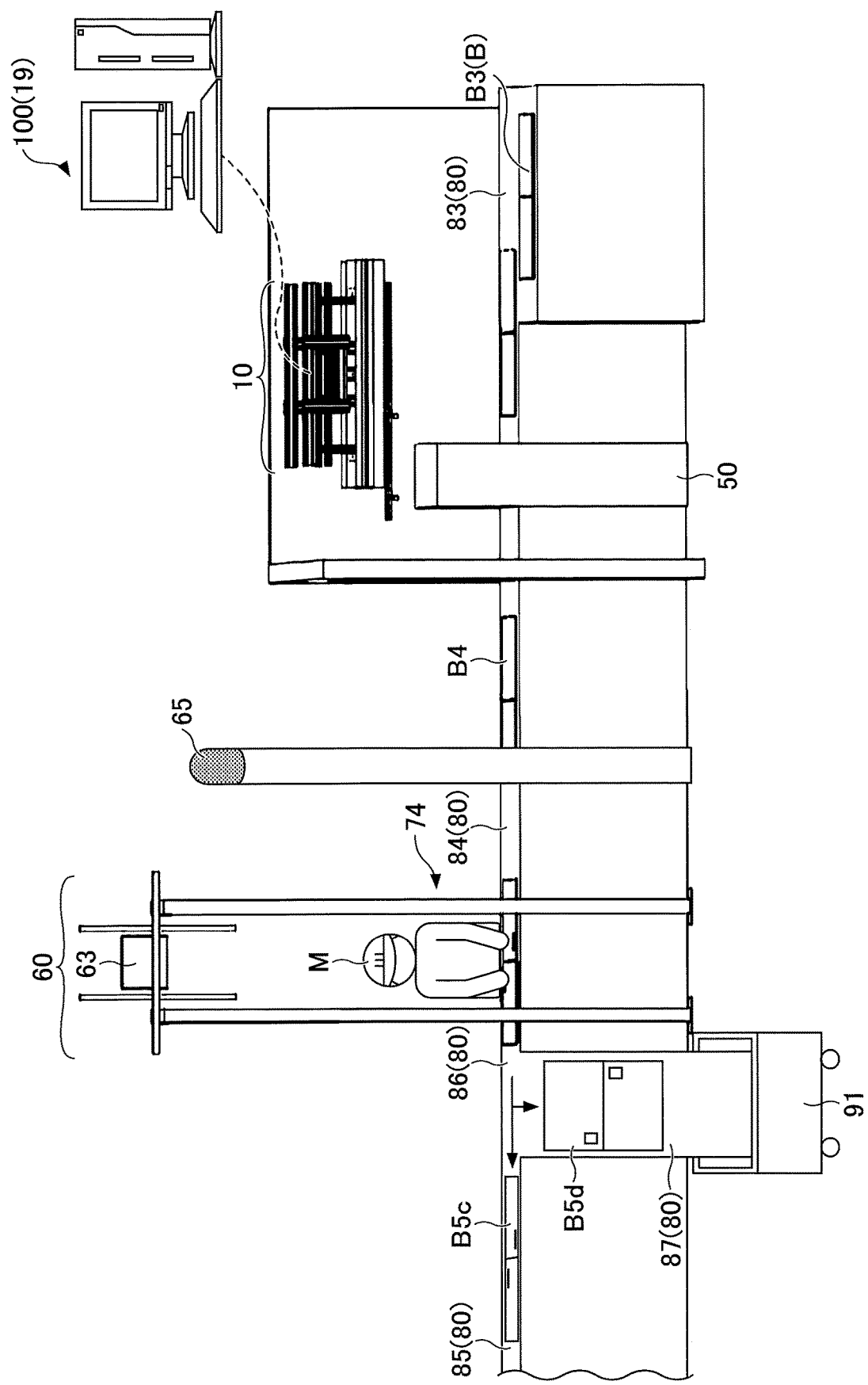
FIG. 2 is an elevational view of an inspection system.

FIG. 1 is a perspective view of a processing and inspection system (manufacturing apparatus) 1 according to a first embodiment of the present invention. FIG. 2 is a drawing used to describe an outline of an inspection apparatus 10 in FIG. 1 and an inspection step performed around the inspection apparatus 10.

A board-shaped object to be conveyed and inspected in the present inventions is, for example, a gypsum board. Gypsum boards are manufactured by forming a long board-shaped material by calcining, molding, and drying gypsum used as a raw material, cutting the board-shaped material into boards, and forming a pattern on each of the boards. Also, a resin sheet may be bonded to a surface of each of the gypsum boards. The gypsum boards manufactured as described above are used, for example, as interior materials for ceilings and walls.

The thickness of a gypsum board to be processed is, for example, 9.5 mm, 12.5 mm, 15 mm, or 21 mm.

The size of a gypsum board to be processed is, for example, 910 mm×1820 mm (3 Japanese feet×6 Japanese feet), 910 mm×2420 mm (3 Japanese feet×8 Japanese feet), 910 mm×2730 mm (2 Japanese feet×9 Japanese feet), 910 mm×910 mm (3 Japanese feet×3 Japanese feet), or 455 mm×910 mm (1.5 Japanese feet×3 Japanese feet).

Although the present invention can be applied to a gypsum board with any thickness and any size, the first embodiment is described based on an assumption that a gypsum board has a size of 455 mm×910 mm (1.5 Japanese feet×3 Japanese feet).

As an example, the processing and inspection system 1 includes a pressing apparatus 30, a painting apparatus 40, the inspection apparatus 10, a reporting apparatus 60, and a sorting (classifying) table 70 for processing performed after formation of a board-shaped material in a process of manufacturing a long gypsum board.

A gypsum board formed by calcination, molding, and drying is cut into boards with a predetermined length by a cutting apparatus (not shown). Each board B1 obtained by cutting (which is hereafter referred to as a predetermined-size board) has a size of, for example, 1.5 Japanese feet×3 Japanese feet.

Here, it is assumed that a gypsum board (patterned board) B3, which is an inspection object of the first embodiment, has a travertine pattern that includes a large number of fine hole-like dents on a surface having a white or high-brightness color (e.g., a cream color or a gray color).

The predetermined-size board B1 is conveyed as a processing object to the pressing apparatus 30 that is a processing apparatus (a press apparatus, a patterning apparatus). The pressing apparatus 30 includes a planar press 31, a pressure-applying part 32, and a support table 33. Details of the pressing apparatus 30 are described later with reference to FIG. 15.

The pressing apparatus 30 presses a surface on which protrusions and indentations are formed against the predetermined-size board B1, which is a processing object, to form a large number of fine hole-like dents constituting the travertine pattern on the surface of the predetermined-size board B1.

A board (dented board) B2 on which hole-like dents are formed is conveyed to the painting apparatus 40. A coating material applied by the painting apparatus (paint applying apparatus) 40 is, for example, paint. The color of the coating material is preferably white or a high-brightness color close to white.

The painting apparatus 40 includes, for example, an application roller 42, a doctor roller 41, a supplier 43, and a supply tube 44. The supply tube 44 supplies paint to the supplier 43, and the supplier 43 supplies the paint to a position above an interface between the doctor roller 41 and the application roller 42. The doctor roller 41 adjusts the amount of paint on the surface of the application roller 42, and the application roller 42 applies the paint to the surface of the dented board B2. The supplier 43 extends in a direction that is the same as the axial direction of the application roller 42. The paint is applied to the dented board B2 by the outer surface of the application roller 42 that is in contact with the dented board B2. Accordingly, the application roller 42 can apply the paint so that the paint does not enter the holes formed in the dented board B2.

The patterned board B3 on which the paint is applied is conveyed to the inspection apparatus 10 and inspected by the inspection apparatus 10. Details of the inspection apparatus 10 are described later with reference to FIGS. 3 through 5.

Figure 4:
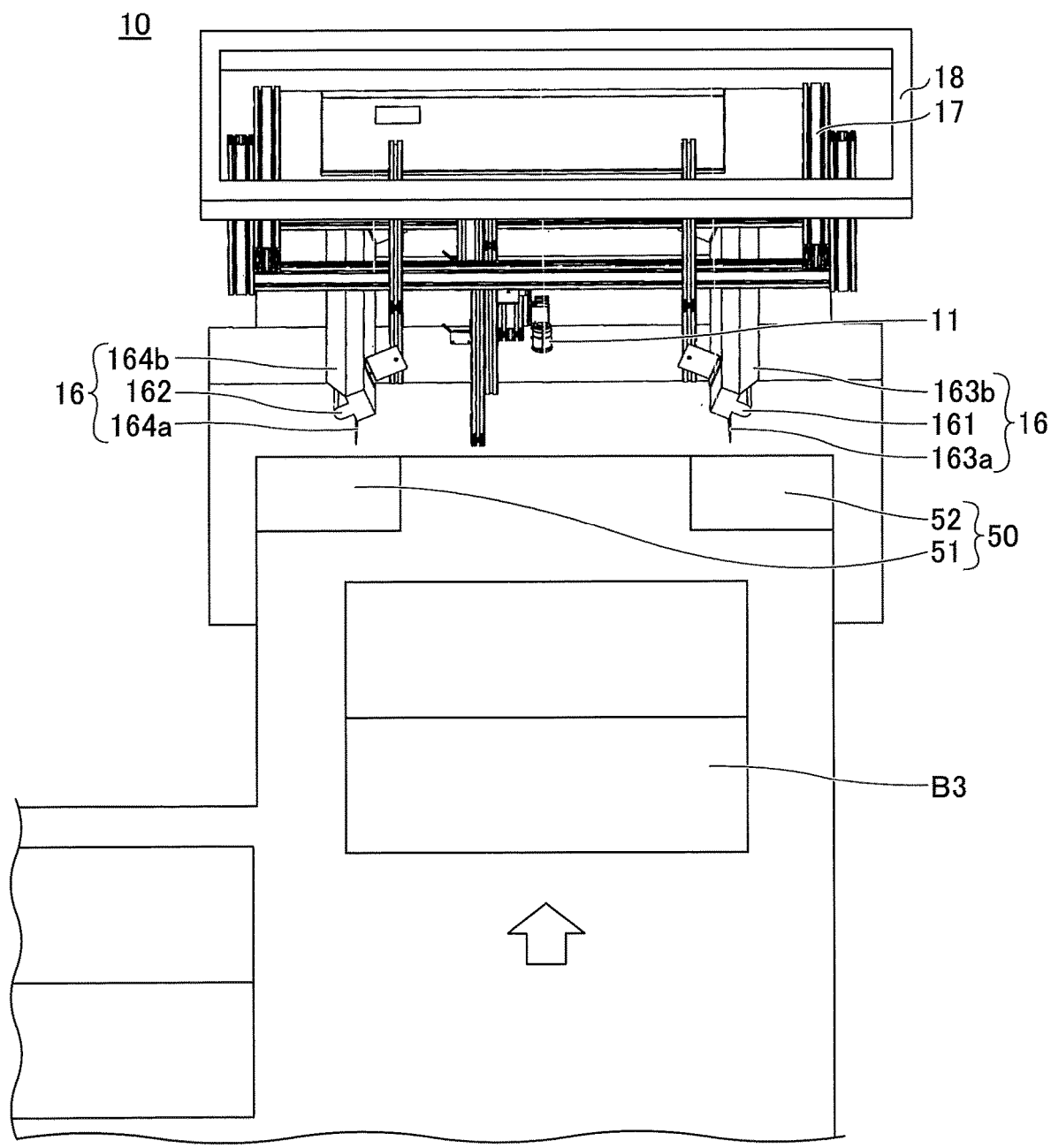
FIG. 4 is a side view of an inspection apparatus and a chamfering apparatus.

Edges of the inspected patterned board B3 are processed (chamfered) by a chamfering apparatus 50. As illustrated in FIG. 4, the chamfering apparatus 50 includes a left chamfering part 51 and a right chamfering part 52 that are disposed on outer sides (edges) in the width direction with respect to the conveying direction, and chamfer two sides (cut away right-angled edges) of the patterned board B3 that are parallel to the conveying direction. For example, the chamfering apparatus 50 cuts away right-angled edges of the patterned board B3 to form sloping or round edges and thereby form a completed board (processed board) B4.

In the example of FIG. 1, the chamfering apparatus 50 is disposed downstream of the inspection apparatus 10. However, the chamfering apparatus 50 may be disposed upstream of the inspection apparatus 10 as long as the chamfering apparatus 50 is disposed downstream of the painting apparatus 40. Also, multiple chamfering apparatuses 50 may be provided upstream and downstream of the inspection apparatus 10 to perform chamfering in stages.

Because sound is generated when the edges of a board are chamfered by the chamfering apparatus 50, a sound-proof wall is preferably provided upstream of the sorting table 70 near which a worker M performs checking and sorting.

The chamfered processed board B4 is conveyed to the sorting table 70.

At the sorting table 70, the worker (M) finally determines whether the processed board B4 is a conforming product (acceptable product) or a defective product (unacceptable product). Here, in the first embodiment of the present invention, to improve the efficiency in the sorting step, the inspection result is reported before the sorting step to attract attention of the worker M. In addition or alternatively, during the sorting step, a defect position in a defective board may be indicated by illuminating the defect position with visible light to attract attention of the worker M.

A conforming product conveying apparatus 85 is provided downstream of the sorting table 70 to convey the processed board B4 to a shipping stage where processed boards B4 are packaged and loaded for shipment. Among processed boards (completed boards) B4, the conforming product conveying apparatus 85 conveys boards (conforming boards) B5$c$ determined to be conforming products to the next stage.

On the other hand, boards (defective boards) B5$d$ determined to be defective products are manually placed in a trolley 90 by the worker M.

Alternatively, as in another exemplary configuration illustrated by FIG. 2, the defective boards B5$d$ may be sorted out by an automatic sorter 86 and ejected from the manufacturing line (into, for example, a stack trolley 91) by a defective product conveying apparatus 87. For example, the defective product conveying apparatus 87 may be inclined downward and toward the downstream end and configured to convey and cause the defective boards B5$d$ determined to be defective products to fall into the stack trolley 91 shaped like a box.

When a predetermined number of defective boards B5$d$ are accumulated in the trolley 90/91, the trolley 90/91 is replaced. The trolley 90/91 with the accumulated defective boards B5$d$ is moved to a recycling apparatus.

Also, at least between the apparatuses, the boards B1, B2, B3, B4, B5$c$, and B5$d$ in the respective stages are conveyed by a conveying apparatus 80. The conveying apparatus 80 includes, for example, conveyer belts, conveyer rollers, conveyer supports, position limiting parts, and direction changing parts.

For example, each conveyer belt is stretched between conveyer rollers to which a driving force is applied and is rotated by the conveyer rollers to convey boards. Each direction changing part changes the direction (e.g., by 90 degrees) in which boards are conveyed by the transfer belts In the conveying apparatus 80, the conveyer belts, the conveyer rollers, and the direction changing parts are supported by support parts as necessary. The conveying apparatus 80 may also include position limiting parts such as limiting rollers for guiding boards being conveyed.

As exemplified by FIG. 1, in addition to the conforming product conveying apparatus 85 (and the automatic sorter 86 and the defective product conveying apparatus 87 as necessary), the conveying apparatus 80 includes a pre-press conveying apparatus 81, a post-press conveying apparatus 82, a pre-inspection conveying apparatus 83, and a post-inspection conveying apparatus 84. Further each apparatus includes a conveying apparatus necessary to perform an operation for the corresponding step.

<Inspection Apparatus>

Figure 3:
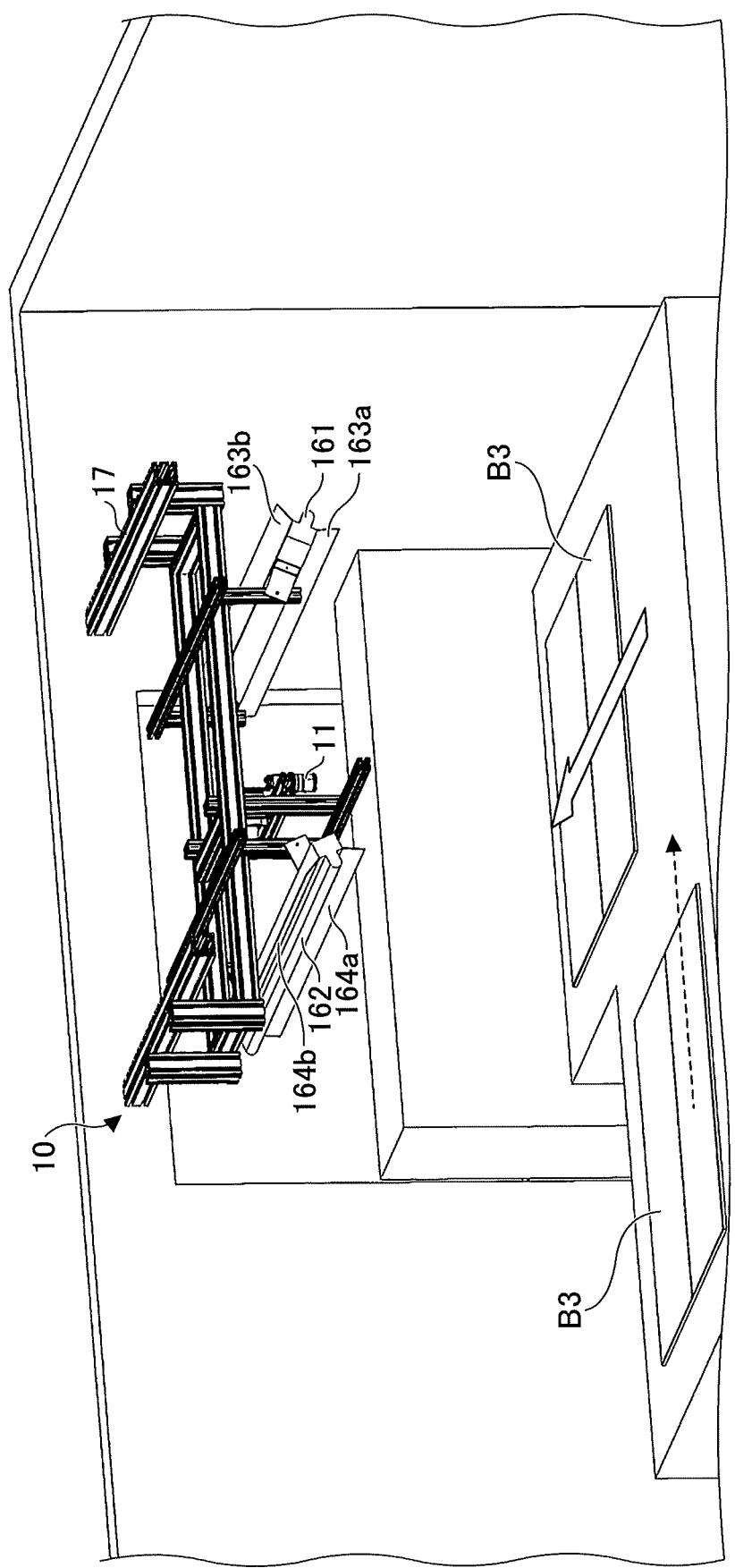
FIG. 3 is a perspective view of an inspection apparatus.

FIG. 3 is a perspective view of the inspection apparatus 10, and FIG. 4 is a side view of the inspection apparatus 10 and the chamfering apparatus 50. Referring to FIGS. 3 and 4, the inspection apparatus 10 includes an imager 11, an illuminator 16, and an inspection controller 19 (see FIGS. 2 and 5). The imager 11 and the illuminator 16 are supported by, for example, a support part 18 disposed above the imager 11 and the illuminator 16.

The imager 11 takes and generates (captures) an image of an upper surface of the patterned board B3 that is a board-shaped inspection object. The imager 11 is, for example, a camera module including a semiconductor imaging device such as a CMOS sensor or a CCD sensor. Here, an imaging operation indicates a process up to the reading of charges generated according to captured light (in this example, reflected light from the patterned board B3) received by pixels. CMOS stands for "Complementary Metal Oxide Semiconductor Image Sensor". CCD stands for "Charge Coupled Device".

The illuminator 16 illuminates the surface of the patterned board B3 when the imager 11 captures an image of the surface of the patterned board B3.

Here, when a CCD camera is used as a typical small imager 11, the middle portion of the captured image tends to become bright. For this reason, it is preferable to illuminate the outer portion of the patterned board B3 to be captured so that this tendency is compensated for and the captured image has uniform brightness. For this purpose, the illuminator 16 is configured as described below.

As illustrated in FIG. 4, the illuminator 16 includes a pair of illuminating lamps 161 and 162 that are arranged so as to be positioned above two facing sides of the patterned board B3. Each of the illuminating lamps 161 and 162 is, for example, one of a fluorescent lamp, a light-emitting diode (LED), a tungsten lamp, a halogen lamp, and a xenon lamp. As illustrated in FIG. 3, the illuminating lamps 161 and 162 extend in a direction that is substantially parallel to a conveying direction of the patterned board B3 indicated by an outlined arrow.

Further, reflecting plates (163*a* and 163*b*, 164*a* and 164*b*) are provided on the inner sides (i.e., sides closer to the center in the width direction) or on the inner sides and the outer sides (edge sides) of the pair of the illuminating lamps 161 and 162.

The reflecting plates 163*a* and 164*a*, which are provided on the inner sides of the illuminating lamps 161 and 162 in the width direction orthogonal to the conveying direction of the patterned board B3, extend substantially vertically downward and are disposed substantially vertically above the facing two sides of the patterned board B3. The reflecting plates 163*a* and 164*a* make it possible to prevent light emitted by the illuminating lamps 161 and 162 from directly entering an inspection side (surface) of the patterned board B3 that is a board-shaped inspection object.

Arranging the illuminating lamps 161 and 162 and the reflecting plates 163*a* and 164*a* as described above enables the imager 11 to capture an image of the patterned board B3 with uniform brightness regardless of the characteristic of a CCD camera used as the imager 11.

When a board is uniformly illuminated by light that is emitted from an illuminator with a predetermined high intensity and reflected by a reflector, and an image of the board is captured by a camera (the imager 11) disposed directly above the board, the captured image has uniform brightness, and no shadow is formed in the image. This in turn eliminates the need to process the image to reduce the influence of a shadow in the image and makes it possible to improve inspection accuracy.

Also, when the patterned board B3 is illuminated with uniform, high-intensity light, fine irregularities on the surface of the patterned board B3 are uniformly illuminated by the light. As a result, the fine irregularities become undetectable, and only defects greater than or equal to a predetermined threshold become detectable. Therefore, inspection accuracy can be improved. Also, the depth and the size of fine irregularities to be made undetectable by illumination with light can be adjusted by adjusting the intensity of light for illuminating the board.

Further, a light-quantity adjuster (light-quantity adjusting unit) 17 for adjusting the light intensity of the illumination lamps 161 and 162 is preferably provided so that the surface of a board can be properly illuminated even when the illumination intensity changes due to dust that rises when the board is processed.

As illustrated in FIG. 2, the inspection controller 19 is connected to the imager 11. The inspection controller 19 performs image processing on an original image obtained by the imager 11 and performs an inspection process. The light-quantity adjuster 17 may be provided in the inspection controller 19, or may be configured to be manually adjustable.

<Control Block>

Figure 5:
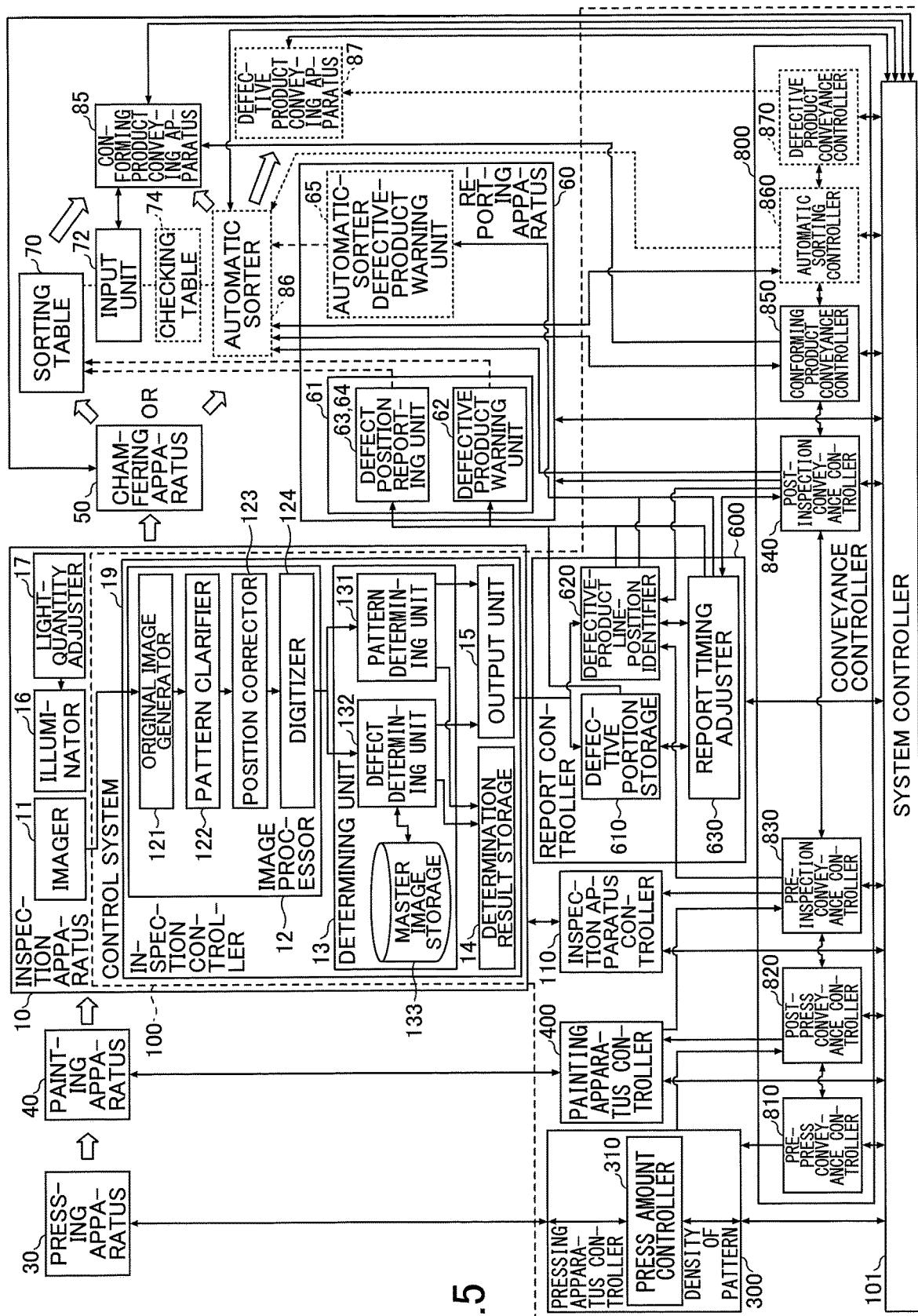
FIG. 5 is a block diagram illustrating an inspection apparatus and a control system.

FIG. 5 is a control block diagram illustrating the entire processing and inspection system 1 including the inspection apparatus 10. As illustrated in FIG. 5, the inspection controller 19 of the inspection apparatus 10 is a part of a control system 100 (see FIG. 2).

The control system 100 for controlling the entire processing and inspection system 1 of the present invention includes, in addition to the inspection controller 19, a system controller 101, and a pressing apparatus controller 300, an inspection apparatus controller 110, a report controller 600, and a conveyance controller 800 for controlling the corresponding apparatuses.

The control system 100 is a type of a computer and includes a processor (system controller 101) such as a CPU or an ASIC, storage devices such as a RAM, ROM, NVRAM, and an HDD, and a communication unit such as a network interface. CPU stands for "central processing unit". ROM stands for "read only memory". RAM stands for "random access memory". NVRAM stands for "non-volatile RAM".

The inspection controller 19 of the inspection apparatus 10 is described with reference to FIG. 5. The inspection controller (inspection control means) 19 of the inspection apparatus 10 includes an image processor 12, a determining unit 13, a determination result storage 14, and an output unit 15.

The image processor 12 is, for example, an application specific integrated circuit (ASIC), and generates, regenerates, and updates inspection images. The image processor 12 includes an original image generator 121, a pattern clarifier 122, a position corrector 123, and a digitizer 124.

Here, it is assumed that the components 121 through 124 of the image processor 12 are implemented by software in a single ASIC. However, some or all of the original image generator 121, the pattern clarifier 122, the position corrector 123, and the digitizer 124 may be implemented by hardware (e.g., by dedicated ASICs).

The pattern clarifier 122 performs so-called "edge detection" where a boundary (edge) between a pattern portion and a non-pattern portion in a captured image is detected based on density variation, and thereby clarifies the pattern portion. For example, there is a method where a location at which the density changes greatly is determined as an edge, and there is a method where a density threshold is set and a portion with a density greater than the density threshold is determined as a pattern portion.

The position corrector 123 corrects a positional error based on a pattern portion clarified by the pattern clarifier 122. Specifically, the position corrector 123 performs a pattern search to search a captured image for a characteristic pattern in a reference image, and corrects an X-axis position, a Y-axis position, and/or an angle θ of the captured image based on the characteristic pattern found in the captured image.

The digitizer 124 digitizes a pattern based on the color density of the pattern. For example, when a pattern is expressed by one color (when the patterned board B3 to be inspected includes two colors: a color of a pattern portion and a color of a non-pattern portion), the pattern can be simply digitized based on the color density without requiring complex calculations. The values obtained by digitization can also be binarized by using a threshold. Also, when, for example, a logo is printed on a board in addition to a pattern, the values can be ternarized (converted into ternary values) by using thresholds.

The determining unit 13 includes a pattern determining unit 131, a defect determining unit 132, and a master image storage 133. The determining unit 13 examines defects and/or a pattern in the patterned board B3 that is an inspection object, and determines whether the processed board B4 is acceptable.

Here, it is assumed that the determining units 131 and 132 of the determining unit 13 are implemented by software in a single ASIC. However, one or both of the pattern determining unit 131 and the defect determining unit 132 may be implemented by hardware (e.g., by dedicated ASICs).

The pattern determining unit (pattern determining means) 131 determines whether the patterned board B3 is acceptable based on the ratios of values obtained by the digitizer 124 or by comparison (difference extraction) with a reference image (conforming image) corresponding to a board that is a sample of a conforming product.

The defect determining unit (defect determining means) 132 detects flaws and smears on the patterned board B3 by comparison (difference extraction) with a reference image used as a comparison criterion for inspection and determines whether the patterned board B3 is acceptable.

An inspection program that performs image processing and calculations for determination processes based on a captured image of the patterned board B3 is stored in a storage device of the control system 100. The inspection program causes the system controller (CPU) 101 to perform the above inspection process.

The inspection program may be provided as an installable or executable file stored in a computer-readable storage medium such as a CD-ROM or a flexible disk (FD). Also, the inspection program may be stored in a computer-readable storage medium such as a CD-R, a DVD, a Blu-ray disk (registered trademark), or a semiconductor memory. DVD stands for "digital versatile disk". The inspection program may also be installed via a network such as the Internet. Further, the whole or a part of the inspection program may be pre-stored in, for example, a ROM of a device (e.g., the imager 11).

In the master image storage 133, a reference image used for comparison performed by the defect determining unit 132 is stored in advance. The reference image is obtained by capturing an image of a board used as a sample of a conforming product and by processing the image.

In FIG. 5, the master image storage 133 and the determination result storage 14 are illustrated as separate components. However, data in these components may be stored in the same storage device such as a RAM, a ROM, an NVRAM, or an HDD.

Determination results of the determining unit 13 are stored in the determination result storage 14 for later reference and are also output via the output unit 15 to the report controller 600 and the pressing apparatus controller 300.

As described above and indicated by a dotted line in FIG. 5, the control system 100 for controlling the entire processing and inspection system 1 of an embodiment of the present invention includes, in addition to the inspection controller 19, the system controller 101, and controllers 300, 400, 110, 600, and 800 for controlling the corresponding apparatuses. Also, although omitted in FIG. 5, the control system 100 may also include a chamfering apparatus controller.

The system controller 101 is a main controller and totally controls processing and inspection operations performed by the processing and inspection system 1.

The pressing apparatus controller 300 controls the pressing apparatus 30. The painting apparatus controller 400 controls the painting apparatus 40. The inspection apparatus controller 110 adjusts various settings of the inspection apparatus 10. The chamfering apparatus controller (not shown) adjusts the width of an edge of a board to be chamfered and the type of chamfering (e.g., the shape of a chamfered edge).

The conveyance controller 800 controls conveyance by the conveying apparatus 80.

Specifically, a press amount controller 310 of the pressing apparatus controller 300 adjusts a control parameter (press amount) of the pressing apparatus 30. The pressing apparatus 30 may be adjusted based on inspection results that are fed back from the inspection apparatus 10. Adjustment of the press amount is described in detail in a second embodiment.

The report controller 600 adjusts a control parameter related to reporting. The report controller 600 includes a defective portion storage 610, a defective-product line-position identifier 620, and a report timing adjuster 630.

The conveyance controller 800 includes a pre-press conveyance controller 810 for controlling the pre-press conveying apparatus 81, a post-press conveyance controller 820 for controlling the post-press conveying apparatus 82, a pre-inspection conveyance controller 830 for controlling the pre-inspection conveying apparatus 83, a post-inspection conveyance controller 840 for controlling the post-inspection conveying apparatus 84, and a conforming product conveyance controller 850 for controlling the conforming product conveying apparatus 85.

Also, when the conveying apparatus 80 includes the automatic sorter 86 as illustrated in FIG. 2, the conveyance controller 800 may also include an automatic sorting controller 860 for controlling sorting at the automatic sorter 86 and a defective product conveyance controller 870 for controlling the conveyance of an automatically-sorted defective product.

The defective-product line-position identifier 620 of the report controller 600 is configured to continuously identify the position on the manufacturing line of a board that is determined by the determining unit 13 as a defective product (unacceptable product). For example, the position of the defective product may be identified based on a conveying speed of the manufacturing line and an elapsed time provided as conveyance information from the post-inspection conveyance controller 840 connected to the post-inspection conveying apparatus 84, or based on the number of processed boards B4 in a section up to the sorting table 70 or the automatic sorter 86.

The defective portion storage 610 stores (or records) information indicating the position of a defective portion of the patterned board B3 (the processed board B4) determined as a defective product by the determining unit 13 in association with a position on the manufacturing line identified by the defective-product line-position identifier 620.

The report timing adjuster 630 controls the timing at which information is reported by a manual-sorting reporter 61 of the reporting apparatus 60. Determination results of the determining unit 13 are reported by a defective product warning unit 62 and a defect position reporting unit 63 at the timing adjusted by the report timing adjuster 630.

Figure 13:
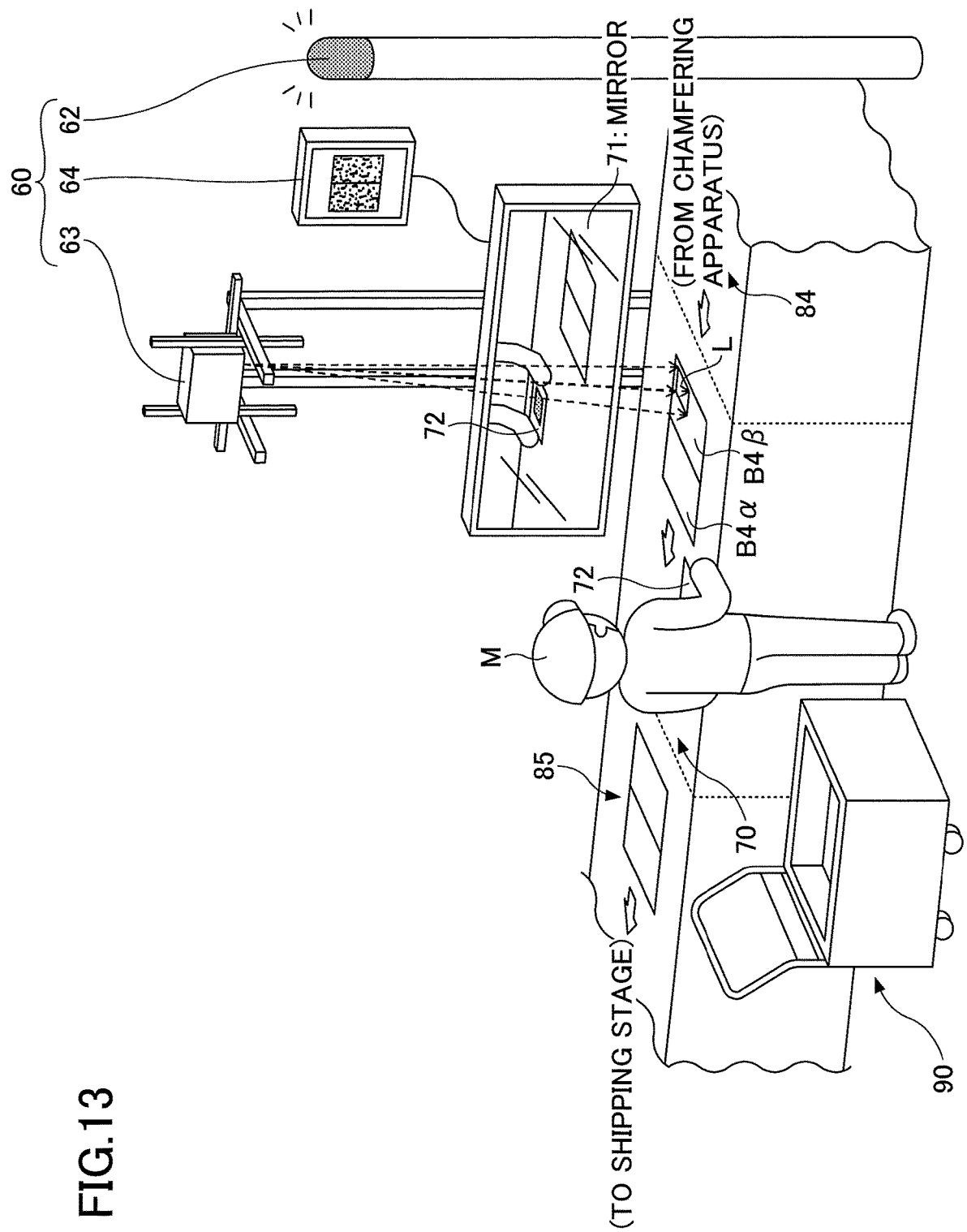
FIG. 13 is a drawing illustrating a state where a defect is being reported in an area around a sorting table.

As illustrated in FIG. 13, the reporter (manual-sorting reporter) 61 includes the defective product warning unit 62 and the defect position reporting unit 63.

The defective product warning unit 62 attracts attention of the worker M by using an alarm and/or light before the worker M sorts a defective product. For example, the defective product warning unit 62 sounds an alarm when a defective product comes close to the sorting table 70. Sounding an alarm makes it possible to reduce the chance that a defective product is overlooked in the final inspection performed by the worker M at the sorting table 70.

The defect position reporting unit 63 highlights a defective portion detected by the determining unit 13 by, for example, illuminating the defective portion with visible light. Illuminating the defective portion makes it easier to identify the defective portion by visual inspection and makes it easier to determine whether a product is acceptable.

The defect position reporting unit 63 is preferably a projection mapping system. A projector may be disposed directly above or diagonally above a board. Illuminating a board from a position diagonally above the board necessitates complex calculations to correct the relative distance. Therefore, it is preferable to illuminate a board from a position directly above the board.

Also, to simplify calculations, when illuminating a defective portion of a processed board B4, it is preferable to temporarily stop the processed board B4 at a position directly below the projector. Also, the defect position reporting unit 63 may be configured to report a defective portion using audio.

Further, the defect position reporting unit 63 may include, in addition to or instead of a projection mapping system, a result display (inspection result display unit) 64.

Providing both of the defective product warning unit 62 and the defect position reporting unit 63 makes it possible to attract attention of the worker M before the sorting operation by sounding an alarm and enable the worker M to easily identify a defective portion during the sorting operation. Thus, this configuration makes it possible to warn the worker M twice and to reduce the chance of overlooking a defective product during visual inspection.

Also, an input apparatus (input unit) 72 is provided near the worker M. The input apparatus 72 is used by the worker M to input decision information when the result of visual inspection is different from a reported inspection result.

A conforming board B5c, which has not been ejected at the sorting table 70 from the system by referring to a reported inspection result, is conveyed by the conforming product conveying apparatus 85 to a downstream stage where a shipping operation is performed.

The reporting apparatus 60 may include, in addition to the manual-sorting reporter 61 for reporting information to the worker M who performs a final decision step, an automatic-sorter defective-product warning unit 65 that reports to (or warns) the automatic sorter 86 of the conveying apparatus 80 that a defective product is to reach the automatic sorter 86. The automatic-sorter defective-product warning unit 65 has a configuration similar to the configuration of the defective product warning unit 62.

In the above descriptions, it is assumed that boards are manually sorted into conforming products and defective products on the sorting table 70. Instead of by manual operations of the worker M at the sorting table 70, boards may be sorted (separated) automatically as illustrated in FIG. 2.

When boards are automatically sorted, the report controller 600 identifies the positions of defective boards based on determination results of the determining unit 13, and the automatic sorter 86 separates and sorts the boards into conforming products and defective products under the control of the automatic sorting controller 860. Boards sorted into defective products by the automatic sorter 86 are automatically ejected by the defective product conveying apparatus 87 as defective boards B5d. Similarly to the case described above, boards sorted into conforming products are conveyed by the conforming product conveying apparatus 85 to a downstream stage where a shipping operation is performed.

Even when automatic sorting is performed, arrival of defective products may also be reported to the worker M by the automatic-sorter defective-product warning unit 65 so that the worker M can visually confirm, on a checking table 74 (see FIG. 2) disposed near the automatic sorter 86, that the defective products are properly ejected out of the system by the automatic sorter 86.

In the example of FIG. 1, the system is centrally managed by the system controller. However, the system may be implemented as a distributed control system where the respective controllers (e.g., the pressing apparatus controller, the inspection apparatus controller, the report controller, and the conveyance controller) independently control the corresponding apparatuses.

<Entire Manufacturing Process>

Figure 6:
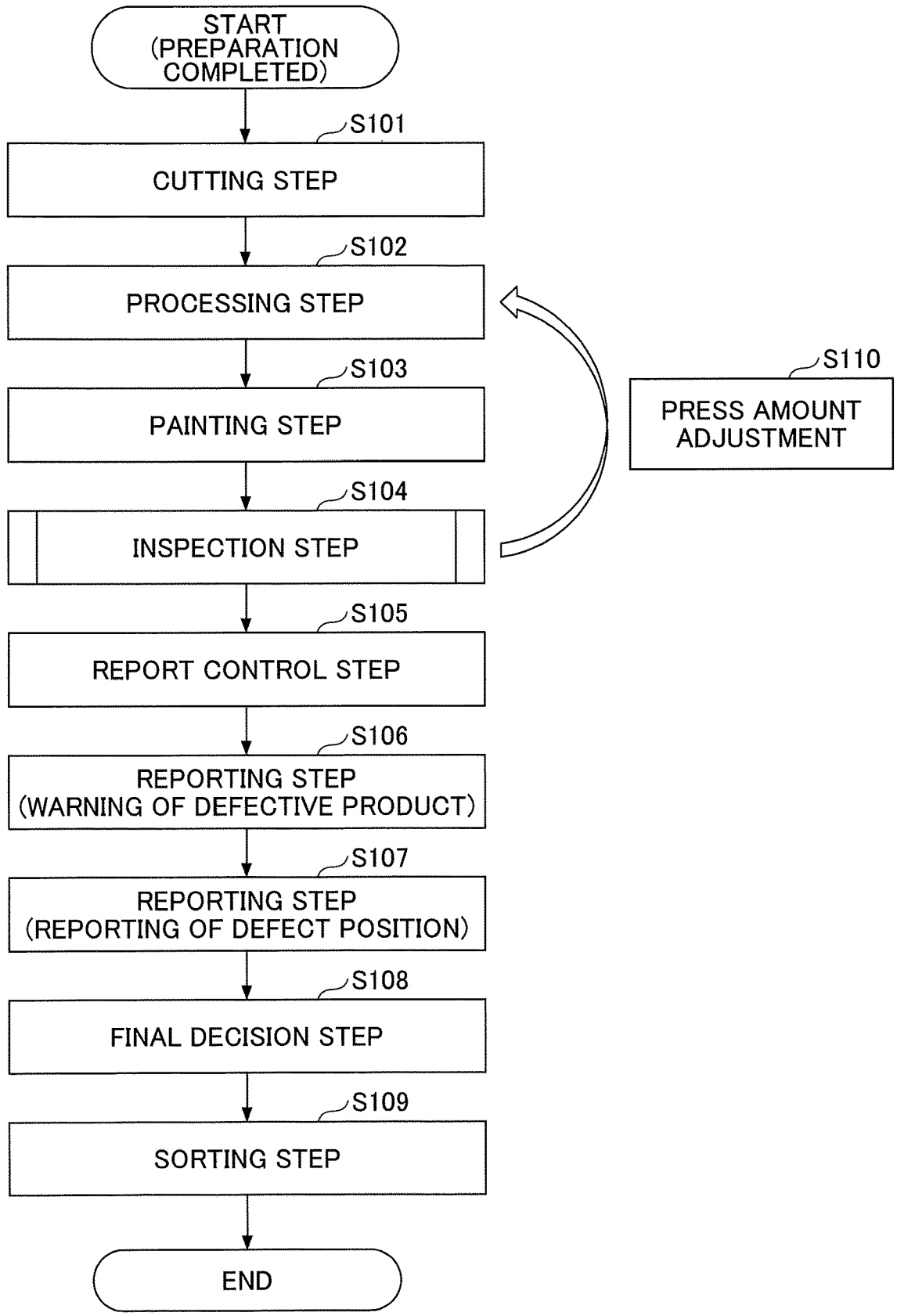
FIG. 6 is a flowchart illustrating an entire manufacturing process.

FIG. 6 is a flowchart illustrating an entire manufacturing process according to the present invention. Here, it is assumed that a board manufactured in this process has a travertine pattern where a large number of fine hole-like dents are formed on a surface having a white or high-brightness color. Also, in FIG. 6, it is assumed that a chamfering step is optional, and the patterned board B3, which is a board with a pattern and used as an inspection object, is equivalent to the processed board B4 to be sorted.

The process starts when formation (preparation) of a gypsum board is completed.

S101: Cutting Step

The formed board with a large size is cut into predetermined-size boards B1 (see FIG. 1) having a predetermined size.

S102: Processing Step

A pattern of indentations is formed on the predetermined-size board B1, which is a processing object, to form a dented board B2.

S103: Painting Step

A paint is applied to the patterned dented board B2 to form an inspection object (patterned board B3).

S104: Inspection Step

The patterned board B3, i.e., an inspection object, is inspected by the inspection apparatus 10. Details of an inspection method are described later with reference to FIGS. 7 through 12.

S105: Defective-Product Line-Position Determining Step+Report Control Step

The defective-product line-position identifier 620 of the report controller 600 identifies (determines) the position on the manufacturing line of the patterned board B3 that is determined by the inspection apparatus as a defective product, and controls the timing at which the reporting apparatus 60 performs reporting.

S106: Reporting Step (Warning of Defective Product)

An alarm is sounded as a warning when the board determined as a defective product comes close to the sorting table 70.

S107: Reporting Step (Reporting of Defect Position)

The position of a defective portion such as a defect or a portion whose density (the density of a pattern) is greater than or equal to a threshold is indicated using visible light.

S108: Final Decision Step

Taking into account the attention attracting information provided at S106 and S107, the worker M visually inspects the processed board B4 and finally determines whether the processed board B4 is acceptable.

S109: Sorting Step

The worker or the defective product conveying apparatus 87 ejects the defective board B5$d$ from the manufacturing line.

The above inspection step makes it possible to automatically detect defects such as flaws and smears in a predetermined range and thereby makes it possible to reduce the load of the worker in sorting boards.

When the worker M detects a defect in a board that is overlooked at the inspection step, the worker M may decide to eject the board as a defective board B5$d$. Also, when the worker M determines that a board determined as a defective product at the inspection step is within an acceptable range, the worker M does not have to eject the board and may treat the board as a conforming board B5$c$.

The manufacturing process is completed through the above steps, and the conforming board B5$c$, which has not been ejected at S109, is conveyed by the conforming product conveying apparatus 85 to a shipping stage.

In parallel with the reporting, at S110, the press amount controller 310 of the pressing apparatus controller 300 may control, based on the inspection result of S104, the processing step (press amount) performed by the pressing apparatus 30. Details of S110 are described in detail in the second embodiment.

<Inspection Step>

Figure 7:
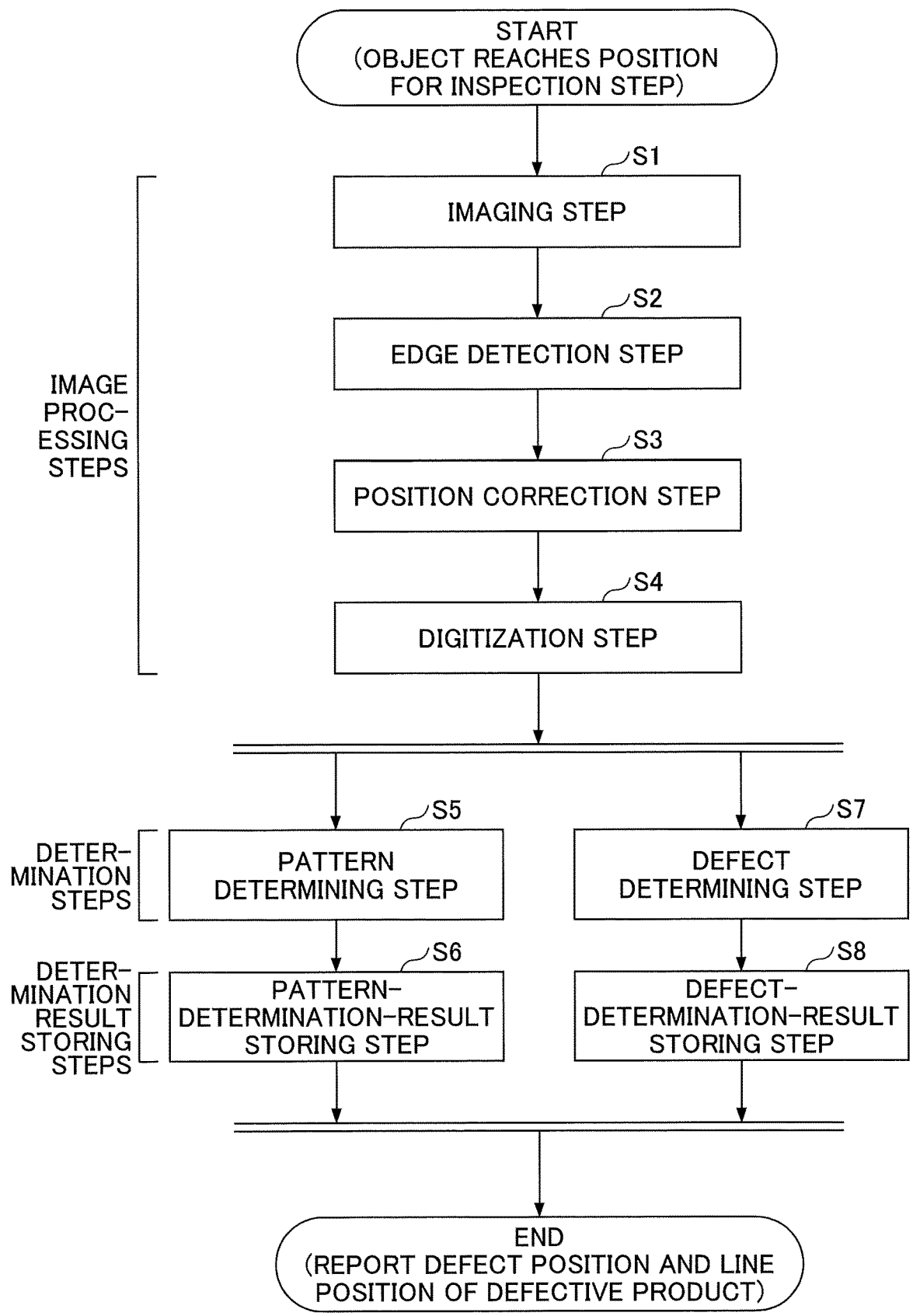
FIG. 7 is a flowchart illustrating details of an inspection step.

FIG. 7 is a flowchart illustrating details of the inspection step. FIG. 7 corresponds to S104 in FIG. 6. The inspection step includes image processing steps (S1-S4), determination steps (S5 and S7), and determination result storing steps (S6 and S8).

S1: Imaging Step

The imager 11 captures an image of an inspection surface of the patterned board B3 that is an inspection object.

S2: Edge Detection Step

The pattern clarifier 122 performs edge detection on the image captured at the imaging step (S1) to clarify a pattern formed on the inspection surface.

S3: Position Correction Step

Based on the image on which edge detection is performed, the position of the patterned board B3 on the conveying path is detected. Then, based on the detection result, the position corrector 123 corrects the position of the patterned board B3 in the image to be inspected.

The position of the patterned board B3 may be detected, for example, by (i) directly detecting a corner of the patterned board B3 and determining a misalignment with a reference image based on the corner;

(ii) extracting two intersecting sides of the patterned board B3, detecting an intersection point between the two sides as a corner, and determining a misalignment with a reference image based on the corner;

(iii) detecting a characteristic pattern in the image and determining a misalignment with a reference image based on the characteristic pattern; and (iv) determining a corner based on a positional relationship between the characteristic pattern detected in method (iii) and the corner and determining a misalignment with a reference image based on the corner.

However, with method (i), because a pattern is formed on the patterned board B3, the pattern may be confused with a vertex, and the vertex may not be directly detected. To accurately detect a vertex even when a captured image is misaligned, methods (ii) through (iv) are preferable. Also, to reduce the number of elements to be detected, method (iii) is preferable.

S4: Digitization Step (Binarization of Pattern)

The patterned board B3 used as an inspection object has a travertine pattern where a large number of fine hole-like dents are formed on a surface with a white or high-brightness color. Therefore, in the digitization step S4, the digitizer 124 can binarize the original image obtained at the imaging step to generate an image with two gradation levels that correspond to a white portion of the inspection surface and black portions representing the hole-like dents (pattern P).

Figure 8:
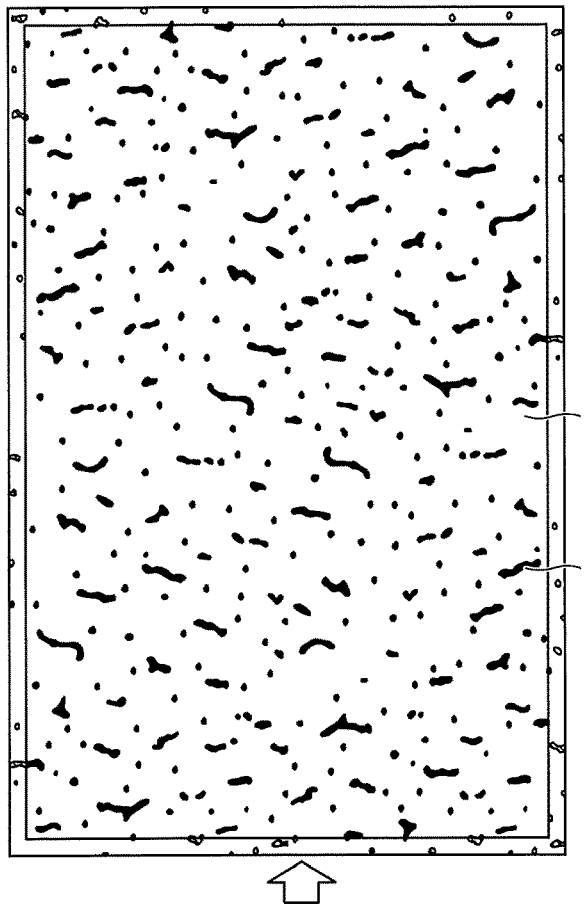
FIG. 8 is drawing used to describe binarization.
Figure 8:
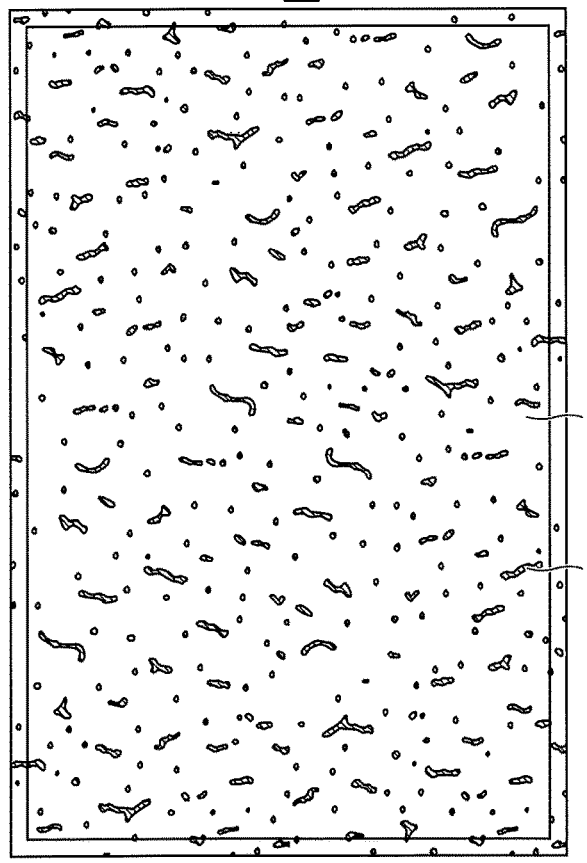

FIG. 8($b$) illustrates an example of a binarized image. The binarization at S4 simplifies the image. This in turn eliminates the need to perform complex calculations for inspection based on the ratios of values and differences from a reference image, and thereby makes it possible to simplify the inspection process.

S5: Pattern Determining Step

In the pattern determining step, based on the image (FIG. 8) generated at the digitization step (binarization of pattern), the pattern determining unit 131 determines whether the ratio of an area occupied by the pattern p is within a predetermined range and thereby determines whether the patterned board B3 is acceptable (conforming product or defective product). Specifically, the pattern determining unit 131 determines the density of the pattern. That is, the pattern determining unit 131 measures the area of black portions, which correspond to dents, in the binarized image.

For example, patterned boards having a hole-like dent pattern and manufactured according to the manufacturing method of the present invention are gypsum boards used for ceilings and walls. Depending on the size of a room, multiple gypsum boards of the same type are attached to a ceiling and/or walls.

If the density of a pattern, i.e., the area of black portions, varies depending on gypsum boards arranged adjacent to each other on a ceiling or a wall, the appearance of the ceiling or the wall becomes uneven. To prevent uneven appearance, the pattern density on respective gypsum boards arranged adjacent to each other needs to be within a predetermined range.

Also, even in one board, the density of a pattern may vary due to variation in applied pressure. For this reason, it is more preferable to divide the patterned board B3, which is a board-shaped inspection object, into multiple sections, to measure the pattern density for each of the sections, and to determine whether the pattern density is within a predetermined range for each of the sections.

Figure 9:
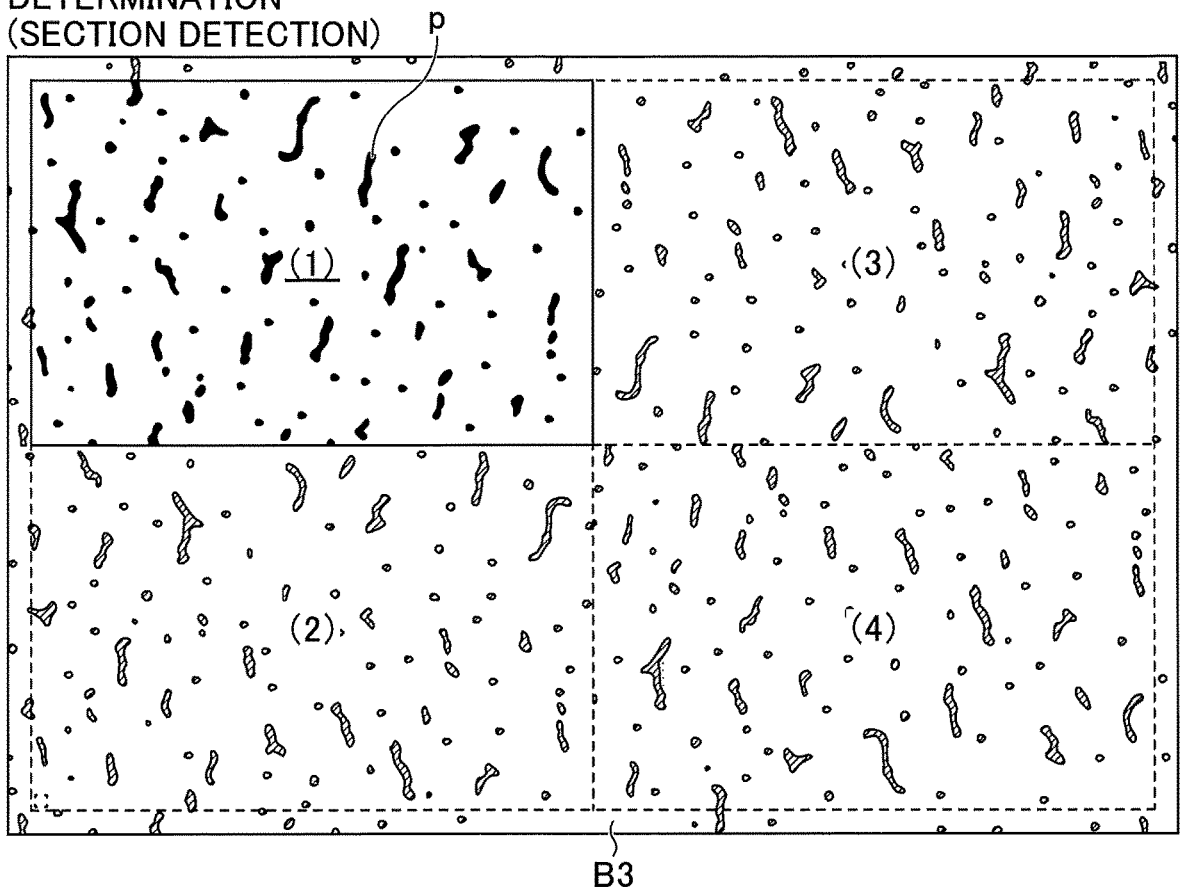
FIG. 9 is drawing used to describe pattern determination.

FIG. 9 illustrates a case where a pattern is inspected for each section. In FIG. 9, the patterned board B3 is divided into four sections. For example, in FIG. 9, a reference range is set for the ratio of the area of black portions (pattern portions) to the entire area (of each of the four sections) in a binarized image. For example, a reference range between an upper limit of 60000 pixels and a lower limit of 20000 pixels is set for each of the four sections (sections (1), (2), (3) and (4)) in FIG. 9.

S6: Pattern-Determination-Result Storing Step

In the pattern-determination-result storing step, the result of determining the acceptability of the patterned board B3 at the pattern determining step and the positional information of defective portions are stored in the determination result storage 14.

S7: Defect Determining Step

In the defect determining step, the defect determining unit 132 compares the image generated at the digitization step (S4) with a reference image used as a comparison criterion for inspection to determine whether any defect such as a flaw or a smear different from pattern elements exists on the surface of the patterned board B3 to be inspected. Based on the determination result, the defect determining unit 132 determines whether the patterned board B3 is acceptable.

Figure 10:
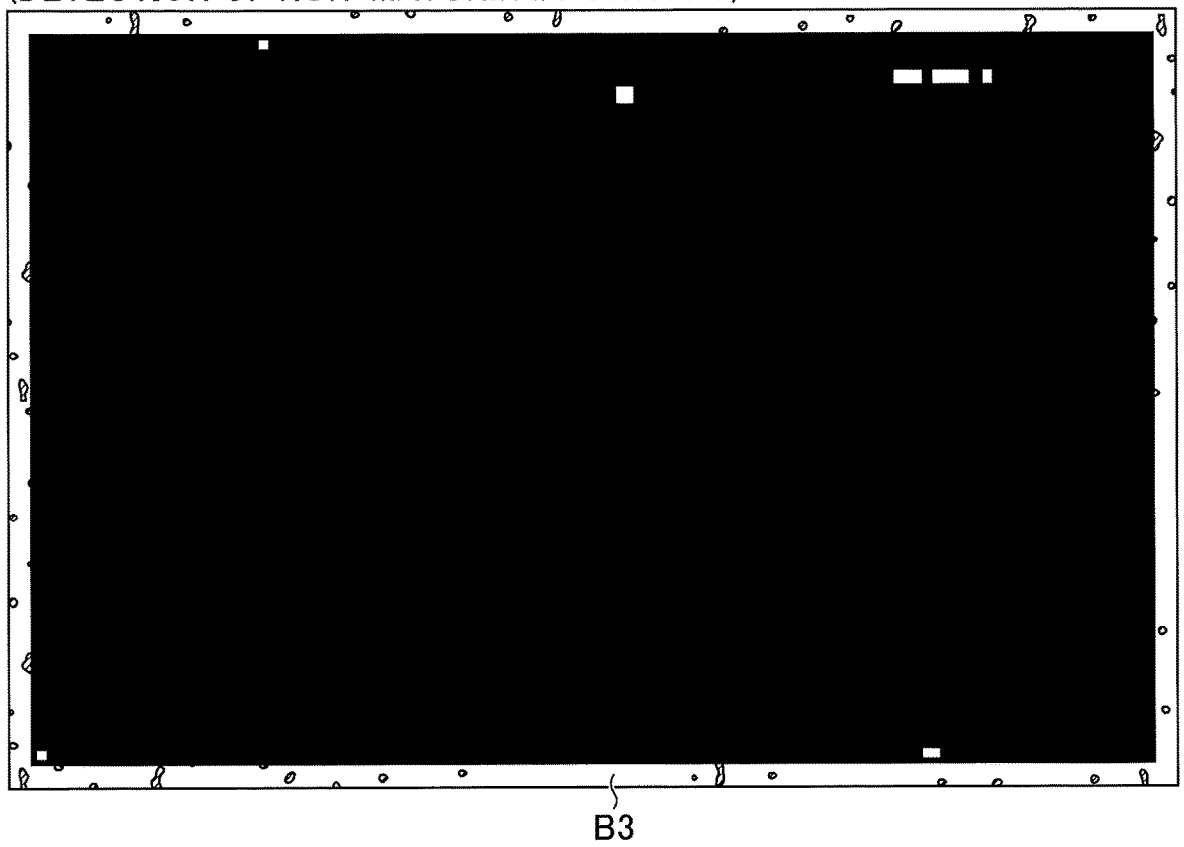
FIG. 10 is a drawing illustrating detected defects.

FIG. 10 illustrates examples of defects detected by the comparison. In a method, a captured image is divided into areas, and one or more of the areas including defects are roughly determined. In another method, exact positions of defects are determined. For example, the exact positions of defects may be determined based on the entire captured image. In another method, portions corresponding to the pattern portions of the patterned board B3 are removed from a captured image, a vertex of the patterned board B3 is detected, and the relative position of a defect with reference to the vertex is determined.

The defect determining step may also be performed for each of sections (e.g., four sections) obtained by dividing a captured image.

In the defect determining step, a change from a black portion to a white portion is not detected as a defect. On the other hand, a change from a white portion to a black portion is detected as a defect. That is, an error around a pattern portion is not strictly determined as a defect.

Specifically, when the image generated at the digitization step (S4) is compared with the reference image corresponding to a conforming product in the defect determining step, in the binarized image, a difference in size of an element that has a shape similar to a hole-like dent and whose perimeter extends along the perimeter of the hole-like dent is not determined as a defect. This is because the sizes of pattern elements become slightly different from those in the reference image depending on the adjustment of the press amount of the pressing apparatus 30.

Figure 11:
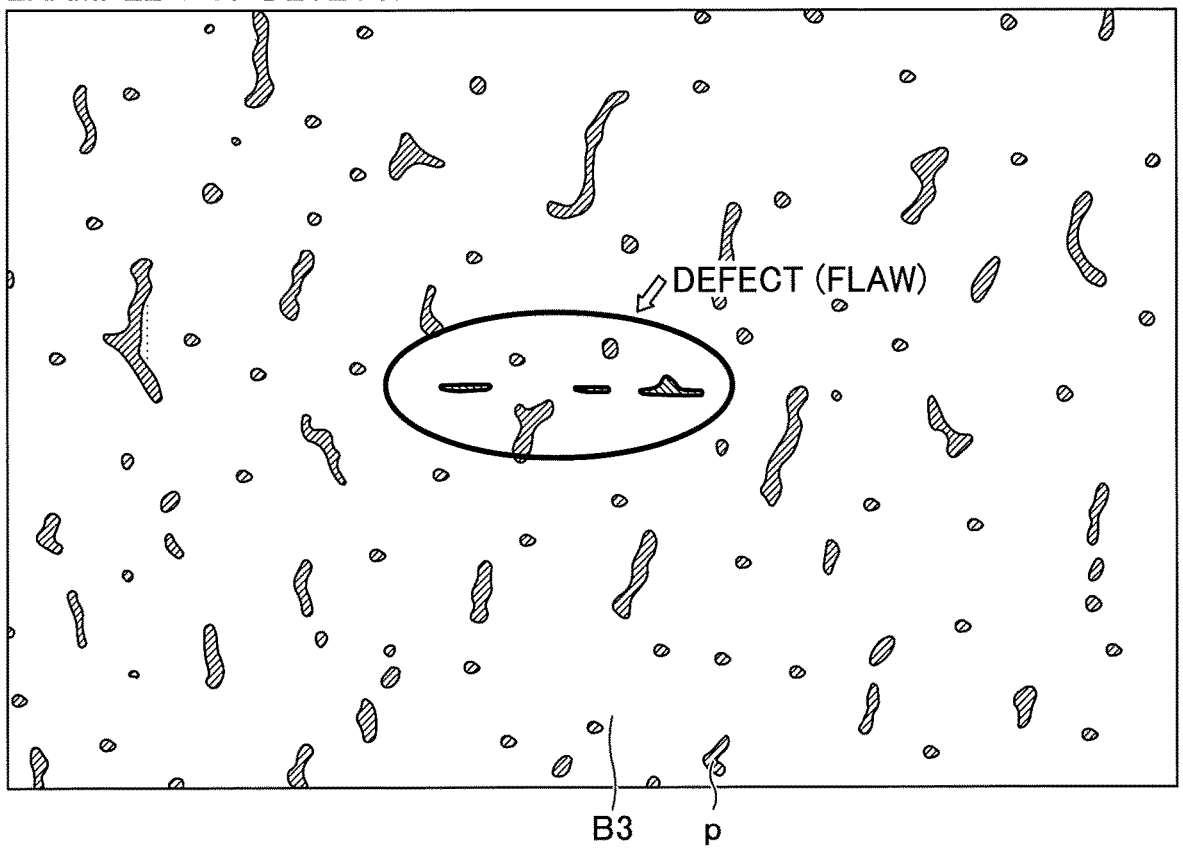
FIG. 11 is a drawing illustrating example 1 of a detected defect.
Figure 12:
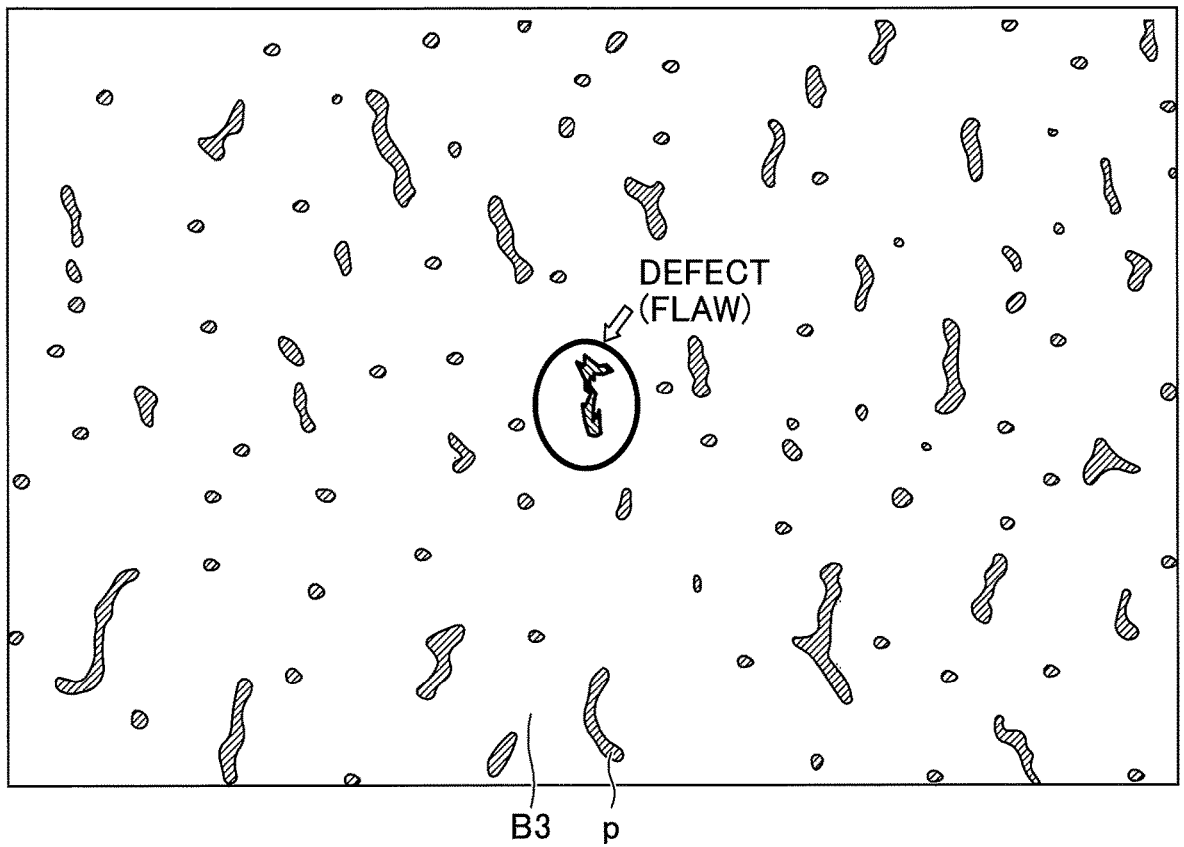
FIG. 12 is a drawing illustrating example 2 of a detected defect.

FIGS. 11 and 12 illustrate examples of defects detected at the defect determining step. As illustrated in FIG. 10, the defects illustrated in FIGS. 11 and 12 are detected by comparing an inspection image with a reference image.

More specifically, differences between an inspection image (an image where a pattern is digitized) and a master image (reference image) are determined (differences are extracted). As described with reference to FIG. 6, the pattern in the present embodiment is formed by pressing a board with protrusions formed on a die of the pressing apparatus 30. The formed pattern is compared with a reference pattern to determine whether each pattern portion is formed by the pressing.

The defect in FIG. 11 has a shape that is apparently different from a pattern portion and is detectable by visual inspection. Therefore, the board is determined as a defective product also at the sorting step. On the other hand, the defect in FIG. 12 has a shape that is similar to the shapes of surrounding pattern portions. Therefore, even if the board is determined as a defective product by the inspection apparatus 10, the board is not necessarily ejected as a defective product if the worker determines at the sorting table 70 that the board is within an acceptable range.

In the example of FIG. 7, the image obtained by binarizing the original image at S4 is used as a common image at the pattern determining step S5 and the defect determining step S7. Alternatively, different thresholds may be used to binarize the original image for the pattern determining step S5 and the defect determining step, S7. That is, images obtained by digitizing one captured image using different thresholds may be used for the pattern inspection and the defect inspection.

S8: Defect-Determination-Result Storing Step

In the defect-determination-result storing step, the result of determining the acceptability of the patterned board B3 at the defect determining step and the positional information of defective portions are stored in the determination result storage 14. Also, after storing the positional information, it is preferable to mark the defective portions so that the defective portions can be tracked and identified at a later final decision step.

For example, defective portions may be marked with physical markings or contactless markings. Because even a patterned board B3 mechanically determined as a defective product may be determined as a conforming product by visual inspection, it is preferable to mark the patterned board B3 with a contactless marking rather than a physical marking. As an example of a contactless marking, an identified defective portion may be recorded in a computer.

Also, at the storing steps S6 and S8, in addition to numeric data of the inspection results, the entire captured image (original image) is preferably stored in a storage device such as the determination result storage 14. The stored information makes it possible to determine the tendency of apparatuses in a long span and can be referred to in case a trouble occurs.

The inspection step is completed as described above (End). After the inspection step, the process proceeds to step S105 in FIG. 6.

When the board reaches a predetermined position on the manufacturing line such as the sorting position or a position immediately before the sorting position, the reporter 61 reports, based on the inspection results of the above inspection step, the position of a defect in a defective product and/or a section of the defective product where the density of a pattern is out of a predetermined range.

The inspection results of the inspection apparatus are used supplementarily for sorting. The above configuration makes it possible to automatically detect defects such as flaws and smears and determine whether the density of a pattern is within a predetermined range, and thereby makes it possible to reduce the load of the worker M in sorting the patterned board B3.

Here, an exemplary process (S106 through S108 in FIG. 6) where the worker M sorts the patterned board B3 with reference to the inspection results of the inspection apparatus 10 is described.

<Final Decision by Visual Inspection>

FIG. 13 illustrates an area around the sorting table 70. Near the sorting table 70, there is provided the reporting apparatus 60 including the defective product warning unit 62, the defect position reporting unit 63, and the inspection result display unit 64. In the example of FIG. 13, a board is conveyed from right to left on the table where the worker M performs operations. However, apparatuses may be arranged as illustrated in FIG. 1 such that a board is conveyed from left to right seen from the worker M.

The worker M determines whether the processed board B4 conveyed to the sorting table 70 is a conforming product or a defective product taking into account inspection results reported by the reporting apparatus 60.

A mirror 71 is provided near the sorting table 70. The worker M may use the mirror 71 to check the further portion of the processed board B4.

Before the worker M determines whether the processed board B4 is acceptable, the defective product warning unit 62 reports, with a sound or light, that the processed board B4 determined as a defective product by the inspection apparatus 10 reaches the sorting table 70. The defective product warning unit 62 is, for example, a siren or a Patlite (registered trademark).

The defect position reporting unit 63 reports the position of a defect when the worker M manually determines whether the processed board B4 is acceptable. The defect position reporting unit 63 is, for example, a projector.

For example, when it is determined in the pattern determining step S5 of FIG. 7 that the ratio of a pattern area in a section of an inspection surface of the patterned board B3 is out of the predetermined range, the defect position reporting unit 63 illuminates the corresponding position on the surface of the processed board B4 as illustrated in FIG. 13 (light L in FIG. 13).

Also, when a defect (flaw) is detected on the patterned board B3 in the defect determining step S7, the defect position reporting unit 63 illuminates a section including the defect or the position of the defect itself in the inspection surface of the processed board B4. Illuminating the defective portion as described above makes it possible to improve the efficiency of the sorting performed by the worker M.

Also, the input apparatus 72 (e.g., a touch panel) is provided near the worker M. The input apparatus 72 is used by the worker M to input decision information when the result of visual inspection is different from a reported inspection result.

<Processing Control>

An embodiment of the present invention may include a processing control step where the processing step is controlled based on inspection results obtained at the inspection step. The processing control step may include, for example, a step (e.g., step S110 in FIG. 6) of adjusting the press amount of the pressing apparatus 30 by the press amount controller 310 of the pressing apparatus controller 300 illustrated in FIG. 5.

In the processing control step, when defects are detected consecutively in surface inspection, information on the defects is fed back to the apparatuses to control the processing step. Various adjusting units may be provided to detect consecutively-occurring defects and to restore the machine to good condition.

Below, an example of feedback of inspection results to the processing step is described based on an assumption that the surface of the patterned board B3 has a travertine pattern where a large number of fine hole-like dents are formed on a surface with a white or high-brightness color.

When pressing is performed in the processing step, an error in a press position or a variation in press amount caused by a problem in the pressing apparatus 30 may result in consecutive detection of defects. In such a case, the problem in the pressing apparatus 30 is fixed by adjusting the pressing pressure in the processing step.

Second Embodiment (Feedback)

Figure 14:
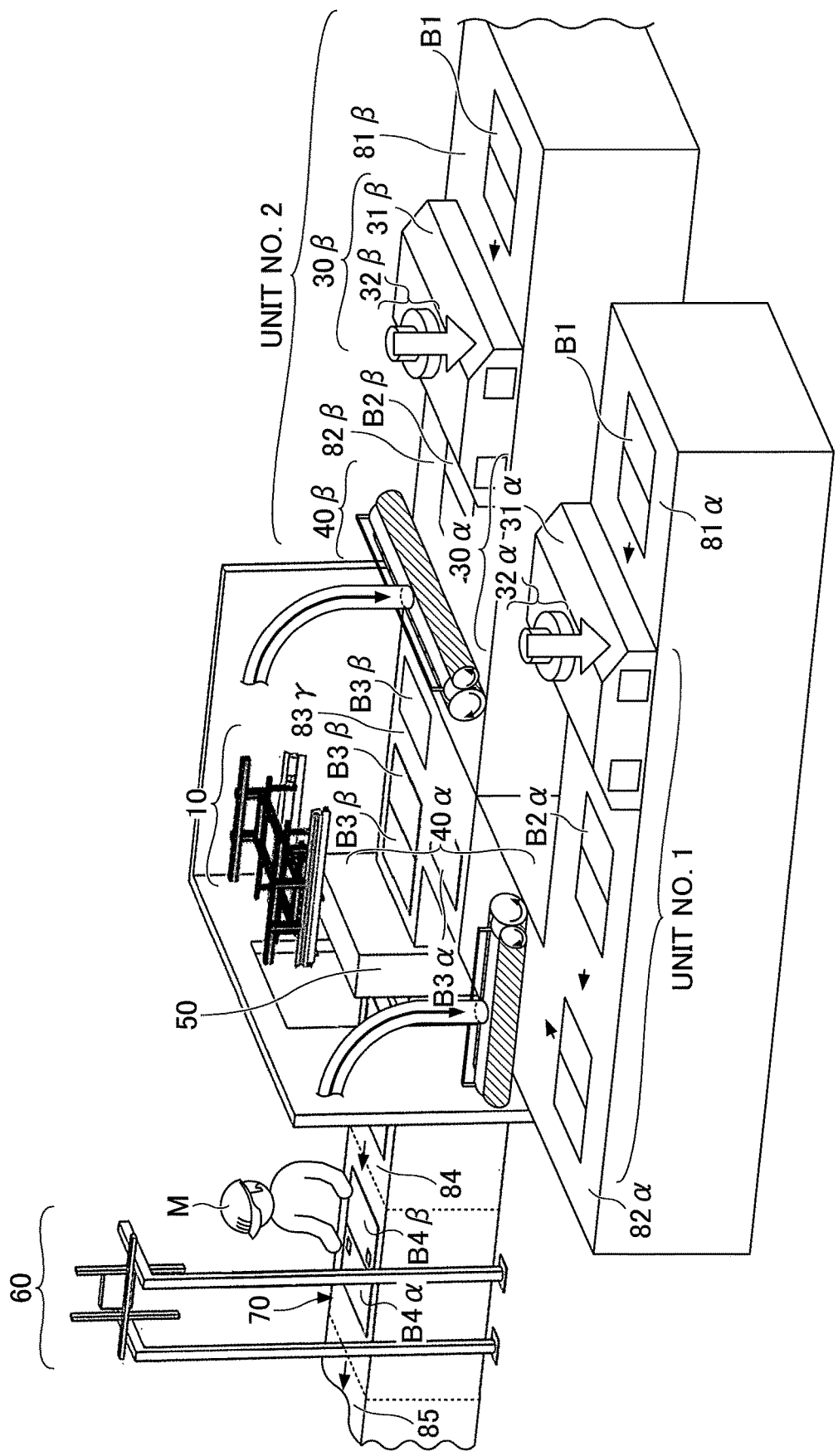
FIG. 14 is a drawing illustrating a processing and inspection system according to a second embodiment of the present invention.

FIG. 14 illustrates a processing and inspection system (manufacturing apparatus) 2 according to a second embodiment. As illustrated in FIG. 14, after a gypsum board is formed and cut into predetermined-size boards B1, the predetermined-size boards B1 may be conveyed through different conveying paths, patterned using different pressing apparatuses, and then caused to converge.

More specifically, in a first processing step, hole-like dents are formed by a first pressing apparatus 30α on a first predetermined-size board B1 and the first predetermined-size board B1 is painted to form a patterned board B3α; and in a second processing step, hole-like dents are formed by a second pressing apparatus 30β on a second predetermined-size board B1 and the second predetermined-size board B1 is painted to form a patterned board B3β. Then, before the inspection step, a specific number of the patterned boards B3α and a specific number of the patterned boards B3β are alternately conveyed into a same path.

For example, one board B3α patterned by a press No. 1 (the first pressing apparatus 30α and a first painting apparatus 40α) and one board B3β patterned by a press No. 2 (the second pressing apparatus 30β and a second painting apparatus 40β) are alternately conveyed. Then, the board B3α and the board B3β converge at a position before the inspection apparatus 10.

Figure 15:
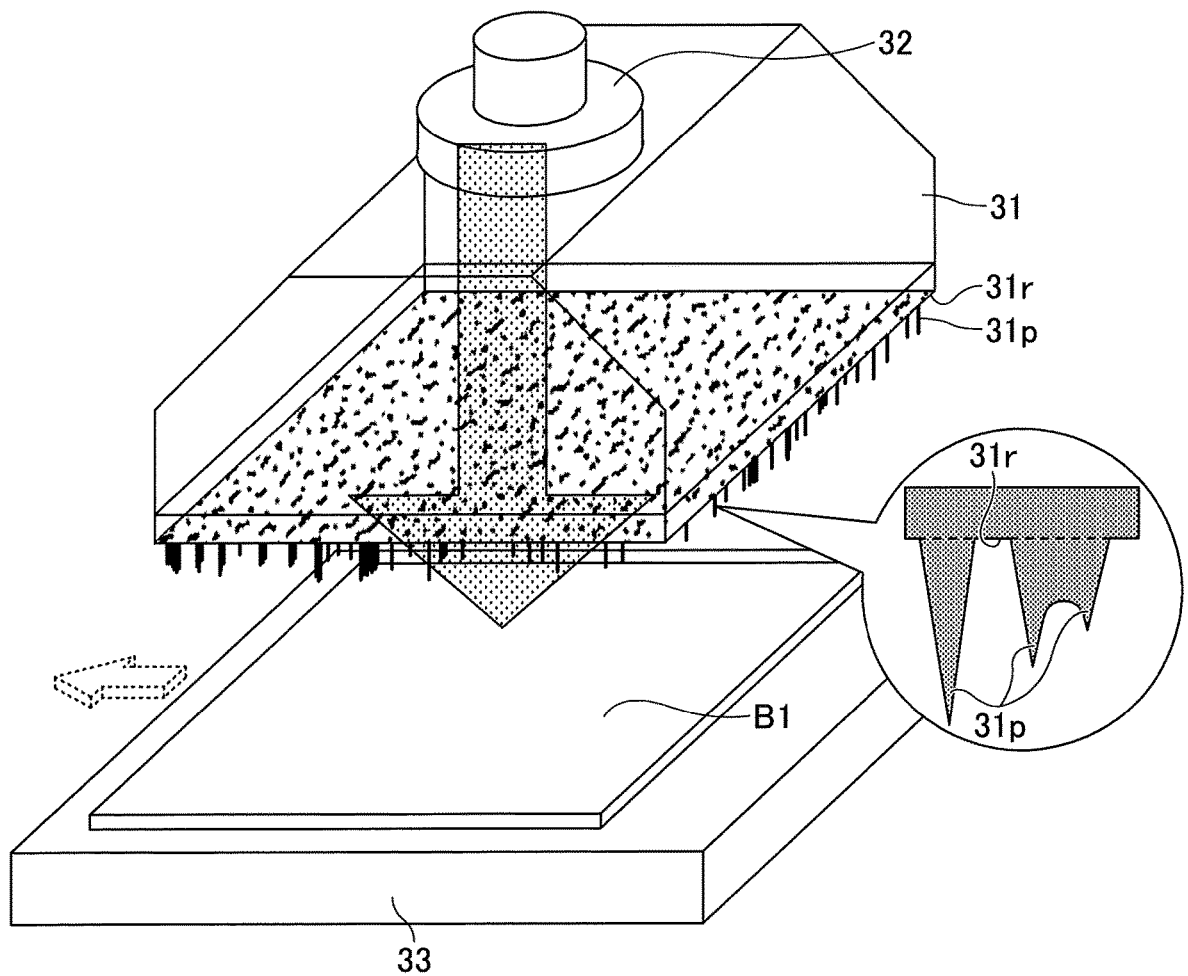
FIG. 15 is a drawing used to describe formation of hole-like dents by a pressing apparatus.

FIG. 15 is a drawing used to describe formation of hole-like dents (patterning) by the pressing apparatus 30 used in the first embodiment and the second embodiment.

The pressing apparatus 30 includes the planar press 31 that is a pressing part, the pressure-applying part 32, and the support table (pad) 33.

The planar press 31 or the pressing part includes a pressing surface (lower surface) having substantially the same size as the predetermined-size board B1 to be pressed. The pressing surface includes multiple protrusions 31p that protrude from a reference surface 31r. The pressure-applying part 32 presses the planar press 31 downward using, for example, hydraulic pressure. The pressing part may also be implemented by a roller having a cylindrical shape.

The support table 33 supports the predetermined-size board B1 at least while the planar press 31 is being pressed downward. As a result of pressing the predetermined-size board B1 with the planar press 31 and the support table 33, a pattern of indentations is formed on the upper surface (front surface) of the predetermined-size board B1.

Before being pressed, the predetermined-size board B1 may be pushed onto the support table 33 by a subsequent predetermined-size board B1. The dented board B2 formed by pressing is pushed out of the support table onto the conveying apparatus 80 by the subsequent predetermined-size board B1 that is pushed by another predetermined-size board B1 following the subsequent predetermined-size board B1.

As an example of the present embodiment, the patterned board B3 has a travertine pattern where a large number of fine hole-like dents are formed on a surface with a white or high-brightness color.

In an embodiment of the present invention, the predetermined-size board B1 is pressed with a pressing part having protrusions to form hole-like dents. After a pattern of hole-like dents is formed, a paint with a white or high-brightness color is applied to the surface of the board (dented board) B2 on which the hole-like dents have been formed. When seen from a distance, dented portions or holes on the patterned board B3 manufactured as described above appear to have a color (black) different form the background.

As illustrated in FIG. 15, as the configuration of the pressing apparatus 30, the protrusions 31p are formed on the lower surface of the planar press 31 that is a planar pressing part. The protrusions 31p on the lower surface of the planar press protrude from the reference surface 31r to form a travertine pattern. Hole-like dents are formed on the dented board B2 by inserting the protrusions 31p into the predetermined-size board B1 that is a processing object.

As illustrated in FIG. 15, each of the protrusions 31p formed on the lower surface has a shape that becomes gradually narrower toward the end. Therefore, as the pressing force (press amount) of the planar press 31 increases, the protrusions 31p enter deeper into the predetermined-size board B1 that is a processing object, and the holes formed in the dented board B2 become larger.

For example, if the planar press 31 is pressed shallowly into the predetermined-size board B1 as a result of a weak pressing force or a short pressing time, the size of holes (elements (dents) of pattern p in FIG. 8) becomes small and the total area of the holes in the entire surface becomes small.

On the other hand, if the planar press 31 is pressed deeply into the predetermined-size board B1 to be processed as a result of a strong pressing force or a long pressing time, the size of holes (elements of pattern p) becomes large and the total area of the holes in the entire surface becomes large. Here, a factor such as a pressing force or a pressing time for adjusting the size of pattern elements (or the density of a pattern) is referred to as a "press amount".

In the present embodiment, a painting step for applying a paint is provided after a pressing step for forming a pattern. Because a paint can be applied almost evenly to boards, it is supposed that the variation in appearance of boards is caused by the variation in depth of pattern elements (dents).

Therefore, the variation in appearance of painted patterned boards B3 to be inspected by the inspection apparatus 10 can be reduced by feeding inspection results back to the pressing apparatus 30 to adjust the press amount and thereby reducing the variation in depth of pattern elements on the dented board B2.

Figure 16:
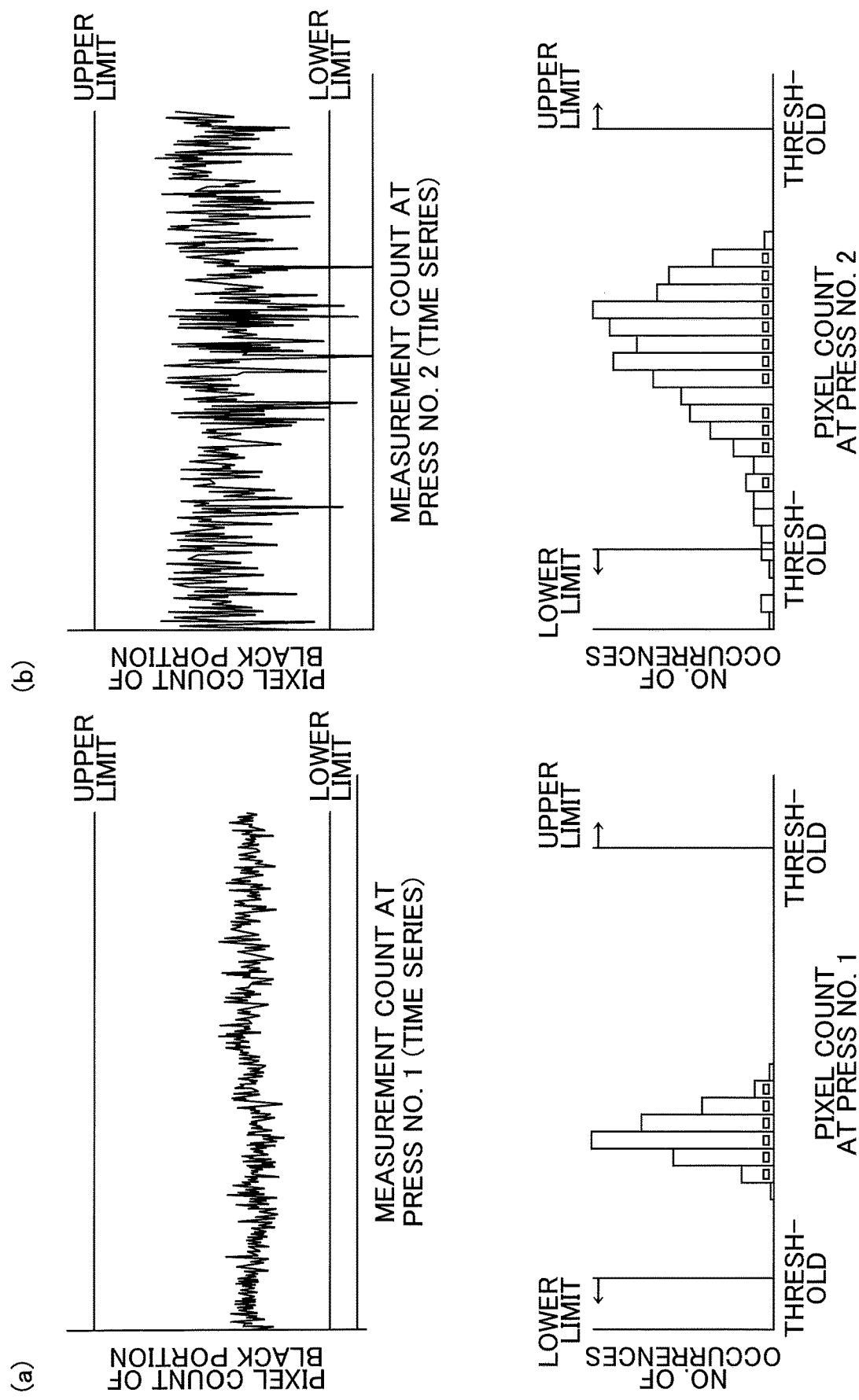
FIG. 16 is a drawing illustrating differences between patterns formed by two pressing apparatuses.

FIG. 16 is a drawing illustrating differences between patterns formed by two pressing apparatuses 30α and 30β. In FIG. 16(a) and FIG. 16(b), the upper graphs indicate changes in the pixel count (area) of black portions measured at successive times. In the upper graphs (measurement graphs), the horizontal axis indicates a time-series measurement count and the vertical axis indicates the pixel count (area) of black portions.

Also, in FIG. 16(a) and FIG. 16(b), the lower graphs are histograms indicating the distribution of pixel counts (areas) of black portions in the upper graphs. In the lower graphs (histograms), the horizontal axis indicates a pixel count (area) of black portions and the vertical axis indicates the number of occurrences.

As indicated by FIG. 16, it is possible to know (visualize) the depth (density) of hole-like dents formed by pressing by calculating the area of a pattern. That is, data indicating a relationship between pressing force and pattern density can be output through inspection. This in turn makes it possible standardize the press (pressure application) management of the pressing apparatuses 30α and 30β.

When hole-like patterns are formed by the pressing apparatuses 30α and 30β, the following parameters influence the depth of holes:

(i) Setting of pressing time (ii) Setting of pressure (which influences pressing depth).

For example, even if the pressure-applying part 32 is set at the same pressure, an actually applied pressure deviates from the set pressure depending on conditions such as in the morning, in the evening, and weather changes. For example, when the planar press 31 is pressed shallowly, the pattern becomes thin and the area occupied by the pattern becomes small. On the other hand, when the planar press 31 is pressed deeply, the pattern becomes thick and the area occupied by the pattern becomes large. Thus, the parameters are adjusted taking into account the variation in the area of a pattern according to the time and weather.

The depth of dents forming a pattern also depends on the hardness of a gypsum board to be processed. The hardness of a gypsum board is determined by various factors such as gypsum materials, the method of kneading water and calcined gypsum, and a drying condition. Complex calculations are necessary to adjust the hardness of a gypsum board. For this reason, irregularities of the pattern can be more directly solved by adjusting the pressing apparatus 30 for forming the pattern.

At the step (processing control step) for controlling the processing step, the area of the pattern calculated at the inspection step is fed back to the pressing apparatus 30α/30β; and at the processing step, the press amount or the pressing time of the pressing apparatus 30α/30β is adjusted to reduce the variation in the depth of hole-like dents formed on the dented boards B2.

Because the area of a pressed surface of the dented board B2 is large (e.g., 1.5 Japanese feet×3 Japanese feet), the applied pressure may vary even in the same dented board B2. As described above, in the inspection step, a board is divided into sections, and the pattern is inspected for each section. This makes it possible to correct irregularities of a pattern in the same board.

For example, irregularities of a pattern in the same board can be corrected by adjusting pressures applied to different portions of the board by changing the inclination of the planar press 31.

Figure 17:
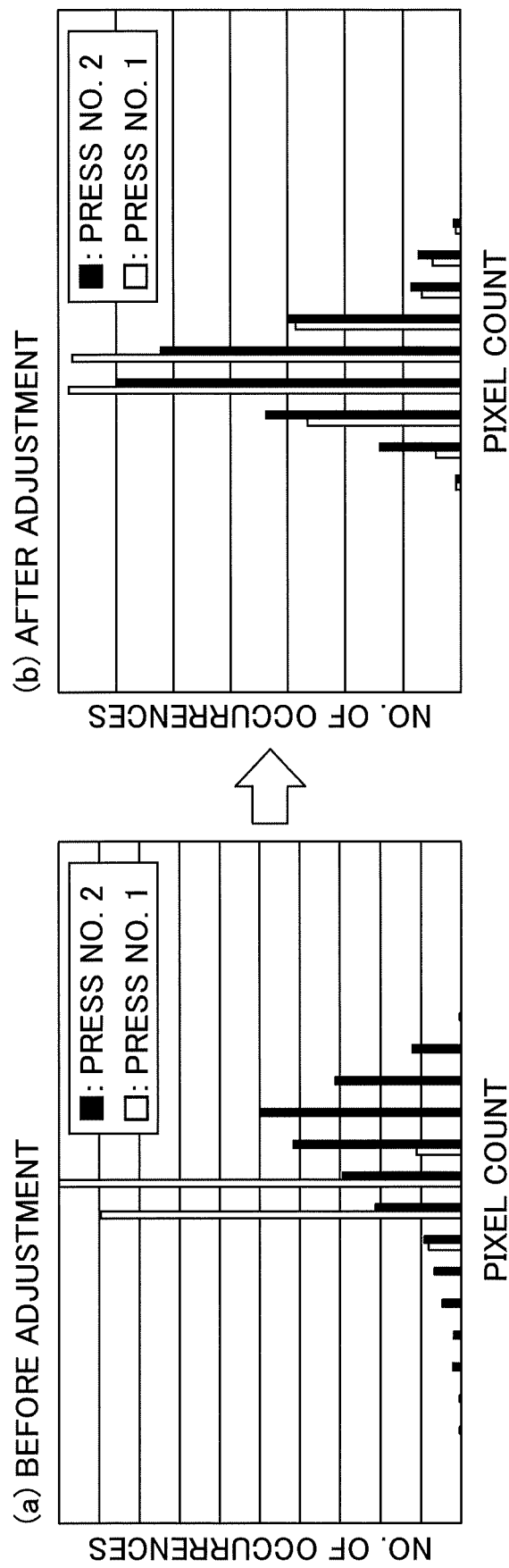
FIG. 17 is a drawing illustrating inspection results obtained after reducing differences between patterns formed by two pressing apparatuses.

FIG. 17 is a drawing illustrating inspection results obtained before and after reducing differences between patterns formed by two pressing apparatuses 30. FIG. 17(a) is a graph obtained by superposing the histograms for the press No. 1 and the press No. 2 in FIG. 16. FIG. 17(b) is a graph obtained by superposing histograms for the press No. 1 and the press No. 2 after reducing differences between patterns formed by the press No. 1 and the press No. 2.

Thus, in the inspection step, patterns formed by the two pressing apparatuses 30α and 30β are inspected by calculating the ratios of areas of the patterns. Based on the inspection results, the press amounts are adjusted such that patterns formed by the first pressing apparatus 30α and patterns formed by the second pressing apparatus 30β become substantially uniform. This configuration makes it possible to reduce irregularities in the pattern densities even when products are manufactured using different pressing apparatuses in the manufacturing process.

Third Embodiment

In the first and second embodiments described above, a patterned board to be inspected has a travertine pattern where a large number of fine hole-like dents are formed on a surface with a white or high-brightness color. However, an inspection object to be inspected by the inspection method of the present invention may have a pattern other than a travertine pattern. For example, an inspection object may have a woodgrain pattern and formed by laminating a board with a decorative layer such as a woodgrain-pattern sheet.

When a product is manufactured by laminating a board with a decorative layer, the product may become defective if the board and the decorative layer are misaligned due to a problem in a laminating unit.

Also in the present embodiment, an image generated at the digitization step is compared with a reference image used as a comparison criterion for inspection to determine whether any defect different from pattern elements exists on the inspection surface of a patterned board that is an inspection object.

In the present embodiment, the sizes of pattern elements basically do not change. Instead, depending on how a sheet is bonded to a board-shaped object, the pattern may be positioned incorrectly. Accordingly, the pattern is compared with a reference image to determine whether the pattern is positioned correctly.

For example, assuming that a board used in the present embodiment has a woodgrain pattern, in the image processing, an image of the woodgrain pattern is captured, a threshold is set for orange-colored grain portions constituting the woodgrain pattern, and the grain portions are separated and extracted by color (the captured image is binarized or ternarized) to generate an image to be compared with a reference image.

Also in the present embodiment, inspection results of the inspection apparatus may be reported in a later step and used to support the sorting.

Also in the present embodiment, when defects are detected consecutively in surface inspection, the inspection results may be fed back to adjust the apparatuses and correct the defects (adjusting apparatuses may be provided).

For example, in the processing step of the present embodiment, the position on a board-shaped object to which a resin sheet is bonded is adjusted based on the inspection results of a pattern in the inspection step. This in turn makes it possible to restore the machine to good condition and to reduce variations in manufacturing.

Fourth Embodiment

In the examples of the first and second embodiments, a patterned board or an inspection object has a travertine pattern; and in the example of the third embodiment, an inspection object has a woodgrain pattern. However, an inspection apparatus of the present invention may be configured to inspect a pattern on which information is printed.

For example, when gypsum boards are used for a shop, a logo of a manufacturing company or a shop name may be printed on the gypsum boards.

In such a case, an original image may be ternarized based on pattern information and print information stored in a memory to generate an inspection image to be compared with a reference image. Alternatively, binarization may be performed separately for an image area including a pattern portion and a non-pattern background portion and an image area including a print portion and the non-pattern background portion to generate an inspection image.

Other steps such as the inspection step, the reporting step, and the feedback step are substantially the same as those in the above embodiments.

A gypsum board used as an inspection object in the first, second, and fourth embodiments of the present invention is formed, for example, by molding a material that is prepared by adding a setting modifier and an adhesion improver for a board base paper to calcined gypsum ($CaSO_4 \cdot \frac{1}{2}H_2O$) and kneading the calcined gypsum with water. As necessary, reinforcing fibers, a lightweight aggregate, and additives such as a refractory material, a setting modifier, a water-reducing agent, bubbles, and a bubble-diameter modifier may be added to calcined gypsum.

A gypsum board used as an inspection object in the third and fourth embodiments of the present invention is formed, for example, by covering one or both sides of a core material made of gypsum with gypsum board base paper and thereby molding the core material into a plate-like shape.

Embodiments of the present invention are described above. However, the present invention is not limited to the specifically disclosed embodiments, and variations and modifications may be made according to applications without departing from the scope of the present invention.

The present application is based on and claims priority to Japanese Patent Application No. 2016-137994 filed on Jul. 12, 2016, the entire contents of which are hereby incorporated herein by reference.

EXPLANATION OF REFERENCE NUMERALS 1, 2 Processing and inspection system (manufacturing apparatus)
10 Inspection apparatus
11 Imager (camera)
12 Image processor
121 Original image generator
122 Pattern clarifier
123 Position corrector
124 Digitizer 13 Determining unit
131 Pattern determining unit
132 Defect determining unit
133 Master image storage
14 Determination result storage
16 Illuminator
161, 162 Illuminating lamp
163a, 163b Reflecting plate
19 Inspection controller
30 Pressing apparatus (press apparatus, processing apparatus)
30α Pressing apparatus (first pressing apparatus)
30β Pressing apparatus (second pressing apparatus)
31 Planar press
310 Press amount controller
40 Painting apparatus (processing apparatus)
60 Reporting apparatus
61 Manual-sorting reporter
62 Defective product warning unit
63 Defect position reporting unit
600 Report controller
620 Defective-product line-position identifier
70 Sorting table
80 Conveying apparatus
B1 Predetermined-size board (processing object)
B2 Dented board
B3 Patterned board (inspection object, board with a pattern)
B4 Processed board (board with a pattern)
B5c Conforming board
B5d Defective board

The invention claimed is:

1. An inspection method for inspecting a board-shaped inspection object with a pattern, the inspection method comprising:
an imaging step of capturing an image of an inspection surface of the inspection object;
a digitization step of digitizing the image of the inspection surface captured by the imaging step; and
a determination step of inspecting the inspection object using the image digitized by the digitization step, wherein
the pattern of the inspection object is comprised of hole-like dents formed on the inspection surface with a white or high-brightness color; and
the determination step includes
a pattern determining step of determining whether a ratio of an area occupied by the pattern comprised of the hole-like dents to an entire area of the image digitized by the digitization step is within a predetermined range and thereby determining whether the inspection object is acceptable, and
a defect determining step of comparing the image digitized by the digitization step with a reference image used as a comparison criterion for inspection to determine whether a defect exists on the inspection surface of the inspection object and determine whether the inspection object is acceptable.

2. The inspection method as claimed in claim 1, wherein in the pattern determining step, the inspection surface of the board-shaped inspection object is divided into multiple sections, the ratio of the area occupied by the pattern is calculated for each of the sections, and whether the ratio of the area occupied by the pattern is within the predetermined range is determined for each of the sections.

3. The inspection method as claimed in claim 1, wherein when the image digitized by the digitization step is compared with the reference image in the defect determining step, in the image digitized by the digitization step, a difference in size of an element that has a shape similar to an element of the pattern and whose perimeter extends along a perimeter of the element of the pattern is not determined as a defect.

4. The inspection method as claimed in claim 1, wherein in the digitization step, the image of the inspection surface captured by the imaging step is binarized to generate an image with two gradation levels corresponding to a portion of the inspection surface with the white or high-brightness color and portions of the inspection surface where the hole-like dents are formed.

5. An inspection and reporting method, comprising:
an inspection step of inspecting an inspection object according to the inspection method of claim 1;
a conveying step of conveying the inspection object on a manufacturing line by a conveying apparatus;
a defective-product line-position identifying step of identifying a position on the manufacturing line of the inspection object that is determined by the inspection step as a defective product; and
a reporting step of reporting information based on the identified position on the manufacturing line.

6. The inspection and reporting method as claimed in claim 5, wherein
the reporting step includes reporting with a sound; and
the reporting with the sound is performed after the inspection step and before a step where the inspection object is inspected by a human to determine whether the inspection object is acceptable.

7. The inspection and reporting method as claimed in claim 5, wherein
the reporting step includes reporting with visible light; and
the reporting with the visible light is performed after the inspection step and during a step where the inspection object is inspected by a human to determine whether the inspection object is acceptable.

8. The inspection and reporting method as claimed in claim 7, wherein
in the determination step, the inspection surface of the board-shaped inspection object is divided into multiple sections, and whether a ratio of an area occupied by the pattern is within a predetermined range is determined for each of the sections; and
in the reporting with the visible light, a position of each of the sections where the ratio of the area is out of the predetermined range is illuminated.

9. The inspection and reporting method as claimed in claim 7, wherein
in the determination step, the inspection surface of the board-shaped inspection object is divided into multiple sections, and whether a defect different from elements of the pattern exists is determined for each of the sections; and
in the reporting with the visible light, a position of each of the sections including the defect or a position of the defect is illuminated.

10. A manufacturing method for manufacturing a board patterned with hole-like dents, the manufacturing method comprising:
a step of obtaining a processing object by molding a material into a board shape;
a processing step of forming a pattern on the processing object, the processing step including a pressing step of pressing an inspection surface of the processing object by a pressing part including protrusions and indentations to form the hole-like dents;
an inspection step of inspecting, as an inspection object, the patterned board on which the pattern is formed by the processing step; and
a processing control step of controlling the processing step according to an inspection result of the inspection step,
wherein the inspection step includes
an imaging step of capturing an image of an inspection surface of the inspection object,
a digitization step of digitizing the image of the inspection surface captured by the imaging step, and
a determination step of inspecting the inspection object using the image digitized by the digitization step; and
wherein the determination step includes
a pattern determining step of determining whether a ratio of an area occupied by the pattern comprised of the hole-like dents to an entire area of the image digitized by the digitization step is within a predetermined range and thereby determining whether the inspection object is acceptable, and
a defect determining step of comparing the image digitized by the digitization step with a reference image used as a comparison criterion for inspection to determine whether a defect exists on the inspection surface of the inspection object and determine whether the inspection object is acceptable.

11. The manufacturing method as claimed in claim 10, wherein
the pattern on the inspection surface of the inspection object is comprised of hole-like dents formed on a surface with a white or high-brightness color; and
the processing step includes
a step of applying a paint with the white or high-brightness color to the inspection surface after the pressing step of forming the hole-like dents on the processing object.

12. The manufacturing method as claimed in claim 10, wherein in the processing control step, a press amount or a pressing time of the pressing step is adjusted based on a depth of the hole-like dents that is calculated based on a ratio of an area occupied by the hole-like dents obtained in the inspection step and that is fed back to the processing step.

13. The manufacturing method as claimed in claim 10, wherein
in the processing step, inspection surfaces of first inspection objects are patterned in a first processing step using a first pressing apparatus and inspection surfaces of second inspection objects are patterned in a second pressing step using a second pressing apparatus, and a specific number of the first inspection objects and a specific number of the second inspection objects are alternately conveyed into a same path before the inspection step; and
in the processing control step, the processing step is controlled based on pattern inspection results of the inspection step so that hole-like dents formed by the first pressing apparatus and hole-like dents formed by the second pressing apparatus become uniform.

14. An inspection apparatus for inspecting a board-shaped inspection object patterned with hole-like dents, the inspection apparatus comprising:
an imager that captures an image of an inspection surface of the inspection object;
a digitizer that digitizes the image of the inspection surface; and
a processor programmed to
inspect the inspection object using the image digitized by the digitizer,
determine whether a ratio of an area occupied by the pattern comprised of the hole-like dents to an entire area of the image digitized by the digitizer is within a predetermined range and thereby determine whether the inspection object is acceptable, and
compare the image digitized by the digitizer with a reference image used as a comparison criterion for inspection to determine whether a defect exists on the inspection surface of the inspection object and determine whether the inspection object is acceptable.

15. The inspection apparatus as claimed in claim 14, wherein the imager includes an illuminator that illuminates the inspection surface of the board-shaped inspection object.

16. The inspection apparatus as claimed in claim 15, wherein
the illuminator includes a pair of illuminating lamps that are arranged so as to be positioned above two facing sides of the board-shaped inspection object and extend in a direction that is substantially parallel to a conveying direction in which the inspection object is conveyed; and
the pair of illuminating lamps include reflecting plates that prevent light emitted by the illuminating lamps from directly entering the inspection surface of the board-shaped inspection object.

17. The inspection apparatus as claimed in claim 16, wherein
the reflecting plates of the pair of illuminating lamps are disposed on inner sides of the illuminating lamps in a width direction of the inspection object that is orthogonal to the conveying direction; and
the reflecting plates extend substantially vertically downward from positions near the inner sides of the illuminating lamps, and are disposed substantially vertically above the facing two sides of the board-shaped inspection object.

18. The inspection apparatus as claimed in claim 14, wherein
when comparing the image digitized by the digitizer with the reference image, the processor is configured such that, in the image digitized by the digitizer, a difference in size of an element that has a shape similar to an element of the pattern and whose perimeter extends along a perimeter of the element of the pattern is not determined as a defect.

19. The inspection apparatus as claimed in claim 14, wherein the digitizer is configured to binarize the image of the inspection surface captured by the imager to generate an image with two gradation levels corresponding to a portion of the inspection surface with the white or high-brightness color and portions of the inspection surface where the hole-like dents are formed.

* * * * *